United States Patent
Hayek et al.

(10) Patent No.: US 11,896,936 B2
(45) Date of Patent: Feb. 13, 2024

(54) POLY(IMIDE-OXADIAZOLE) MEMBRANES FOR GAS SEPARATION APPLICATIONS

(71) Applicant: Saudi Arabian Oil Company, Dhahran (SA)

(72) Inventors: Ali Hayek, Dhahran (SA); Abdulkarim Alsamah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 455 days.

(21) Appl. No.: 17/148,751

(22) Filed: Jan. 14, 2021

(65) Prior Publication Data
US 2022/0219127 A1    Jul. 14, 2022

(51) Int. Cl.
*B01D 53/22* (2006.01)
*B01D 71/64* (2006.01)
*B01D 67/00* (2006.01)
*B01D 71/80* (2006.01)
*C08G 73/10* (2006.01)

(52) U.S. Cl.
CPC ........... *B01D 71/64* (2013.01); *B01D 53/228* (2013.01); *B01D 67/0006* (2013.01); *B01D 71/80* (2013.01); *C08G 73/1021* (2013.01); *C08G 73/1067* (2013.01); *C08G 73/1085* (2013.01)

(58) Field of Classification Search
CPC .... B01D 67/0006; B01D 71/64; B01D 71/80; B01D 53/228; C08G 73/1067; C08G 73/1085; C08G 73/1021
See application file for complete search history.

(56) References Cited

U.S. PATENT DOCUMENTS 3,413,267 A * 11/1968 Kreuz ................ C08G 73/1042
528/229
3,422,061 A * 1/1969 George ............. C08G 73/1064
528/229

(Continued)

FOREIGN PATENT DOCUMENTS

CN      103450029     12/2013
CN      110467728     11/2019
(Continued)

OTHER PUBLICATIONS

Bruma et al., "Polyimides Containing 1,3,4-Oxadiazole Rings," Collect. Czech. Chem. Commun., 2008, 73(12):1631-1644.

(Continued)

*Primary Examiner* — Anthony R Shumate
(74) *Attorney, Agent, or Firm* — Fish & Richardson P.C.

(57) ABSTRACT

A gas separation membrane is provided. The gas separation membrane includes a poly(imide-oxadiazole) polymer including an oligomer having a structure comprising:

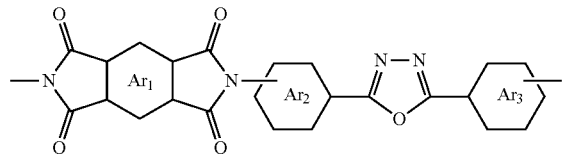

In this structure, $Ar_1$, $Ar_2$, and $Ar_3$ include aromatic moieties, and wherein $Ar_1$, $Ar_2$, and $Ar_3$ are each independently selected.

17 Claims, 15 Drawing Sheets

(56) References Cited

U.S. PATENT DOCUMENTS

| | | | |
|---|---|---|---|
| 3,621,076 A | 11/1971 | Winter et al. | |
| 3,661,849 A * | 5/1972 | Culbertson | C08G 73/1085 528/229 |
| 3,705,869 A * | 12/1972 | Darmory | C08G 73/16 524/742 |
| 3,941,749 A | 3/1976 | Frost | |
| 4,962,183 A * | 10/1990 | Chen, Sr. | C08G 73/105 528/229 |
| 5,306,476 A * | 4/1994 | Jalan | C01B 17/04 423/220 |
| 5,779,879 A * | 7/1998 | Dieterich | B01D 53/22 204/278 |
| 6,692,528 B2 * | 2/2004 | Ward | C02F 1/44 623/23.58 |
| 7,279,237 B2 * | 10/2007 | Thompson | H10K 85/341 428/917 |
| 9,962,646 B2 | 5/2018 | Yahaya et al. | |
| 11,007,491 B2 | 5/2021 | Yahaya et al. | |
| 2003/0097003 A1 | 5/2003 | Lindsay et al. | |
| 2003/0105270 A1 | 6/2003 | Lindsay et al. | |
| 2005/0045874 A1 * | 3/2005 | Xiao | H10K 30/211 257/40 |
| 2007/0068382 A1 * | 3/2007 | Ku | B01D 71/024 96/11 |
| 2010/0075393 A1 * | 3/2010 | Shear | B82Y 10/00 422/600 |
| 2011/0130611 A1 | 6/2011 | Gonzalez et al. | |
| 2016/0177035 A1 * | 6/2016 | Liu | B01D 53/228 585/818 |
| 2016/0310913 A1 * | 10/2016 | Wu | C08G 83/008 |
| 2018/0339275 A1 | 11/2018 | Kitamura et al. | |
| 2018/0345229 A1 | 12/2018 | Yahaya et al. | |
| 2019/0329190 A1 * | 10/2019 | Kim | C08G 73/0672 |
| 2020/0269195 A1 | 8/2020 | Yahaya et al. | |
| 2020/0269196 A1 | 8/2020 | Yahaya et al. | |
| 2021/0309803 A1 | 10/2021 | Hayek | |
| 2021/0395456 A1 | 12/2021 | Liu et al. | |

FOREIGN PATENT DOCUMENTS

| | | |
|---|---|---|
| JP | 2006003715 | 1/2006 |
| WO | WO 2011143530 | 11/2011 |
| WO | WO 2016100058 | 6/2016 |
| WO | WO 2017145747 | 8/2017 |

OTHER PUBLICATIONS

Cristea et al., "Thermal behavior of aromatic polyamic acids and polyimides containing oxadiazole rings," J Therm Anal Calorim., 2008, 93(1):63-68.

Dămăceanu et al., "Polymers containing 1,3,4-oxadiazole rings for advanced materials," Memoirs of the Scientific Sections of the Romanian Academy, 2011, 34, 24 pages.

Damaceanu et al., "Tuning of the color of the emitted light from new polyperyleneimides containing oxadiazole and siloxane moieties," Dyes and Pigments. 2013, 99(1), 46 pages.

Frost et al., "Benzimidazole- and oxadiazole-modified aromatic polyimides," J. Polym. Sci. A-1 Polym. Chem., 1968, 6:215-233.

Grabiec et al., "Poly(amide imides) and Poly(ether imides) Containing 1,3,4-Oxadiazole or Pyridine Rings: Characterizations and Optical Properties," The Journal of Physical Chemistry A, 2009, 113(8):1481-1488.

Grucela-Zajac et al., "Photophysical, electrochemical and thermal properties of new (co)polyimides incorporating oxadiazole moieties," Synthetic Metals, 2014, 188:161-174.

Hamciuc et al., "Poly(1,3,4-oxadiazole-imide)s containing dimethylsilane groups," European Polymer Journal., 2005, 41(12):2989-2997.

Hamciuc et al., "Synthesis and photophysical study of some new highly thermostable blue fluorescent poly(1,3,4-oxadiazole-imide)s containing dimethylamine groups," Reactive and Functional Polymers, 2016, 103:17-25.

Hossain et al., "A Facile Synthesis of (PIM-Polyimide)-(6FDADurene-Polyimide) Copolymer as Novel Polymer Membranes for CO2 Separation," Membranes, 2019, 9(113):1-14.

Hsu et al., "Electroluminescence and electron transport characteristics of aromatic polyimides containing 1,3,4-oxadiazole moiety," Thin Solid Films, 2007, 515(17):6943-6948.

Pavlova et al., "Dependence of the conformational parameters of polyimides on the chemical structure of the chain," J. Polym. Sci. Polym. Phys. Ed., 1980, 18:1175-1186.

Rusu et al., "Copoly(peryleneimide)s containing 1,3,4-oxadiazole rings: Synthesis and properties," J. Polym. Sci. A Polym. Chem., 2010, 48:4230-4242.

Rusu et al., "n-Type Polymides Incorporating Oxadiazole and perylene fluorophores," Environmental Engineering and Management Journal, Jan. 2019, 18(1):89-98.

Xu et al., "A fluorescent copolyimide containing perylene, fluorene and oxadiazole units in the main chain," Reactive and Functional Polymers, 2006, 66(4):471-478.

Luo et al., "A Side-Chain Dendronized Nonlinear Optical Polyimide with Large and Thermally Stable Electrooptic Activity," Macromolecules, 2004, 37:248-250, 3 pages.

Robeson et al., "The Upper Bound Revisited," Journal of Membrane Science, 2008, 320:390-400, 11 pages.

Wu et al., "A novel hydroxyl-containing polyimide as a colorimetric and ratiometric chemosensor for the reversible detection of fluoride ions," Polym. Chem., 2019, 8 pages.

Wu et al., "Facile fabrication of a fluorene-containing polyimide film-based fluorescent sensor for rapid and selective detection of fluoride ion," Journal of Photochemistry and Photobiology A: Chemistry, 2022, 425:113728, 7 pages.

Wu et al., "Facile synthesis of acyloxy-containing fluorene-based Cardo polyimides with high optical transparency, fluorescence and low dielectric constant," Reactive and Functional Polymers, 2021, 166:104979, 9 pages.

Wu et al., "Multifunctional polyimides by direct silyl ether reaction of pendant hydroxy groups: Toward low dielectric constant, high optical transparency and fluorescence," European Polymer Journal, 2020, 132:109742, 8 pages.

Wu et al., "Ratiometric and colorimetric sensors for highly sensitive detection of water in organic solvents based on hydroxyl-containing polyimide-fluoride complexes," Analytica Chimica Acta., 2020, 1108:37-45, 9 pages.

Wu et al., "Simultaneously Improving the Optical, Dielectric, and Solubility Properties of Fluorene-Based Polyimide with Silyl Ether Side Groups," ACS Omega, 2022, 7:11939-11945, 7 pages.

Wu et al., "Synthesis and properties of cardo-type polyimides containing hydroxyl groups for application in specific detection of fluoride ion," Dyes and Pigments, 2020, 173: 107924, 8 pages.

Yang et al., "Nonvolatile write-once read-many-times memory behaviors of polyimides containing tetraphenyl fluorene core and the pendant triphenylamine or carbazole moieties," Journal of Polymer Science Part A: Polymer Chemistry, Jun. 2018, 56(15): 1630-1644, 15 pages.

Yang et al., "Synthesis and resistive switching characteristics of polyimides derived from 2,7-aryl substituents tetraphenyl fluorene diamines," European Polymer Journal, Nov. 2018, 108:85-97, 13 pages.

Zhang et al., "Enhanced gas separation and mechanical properties of fluorene-based thermal rearrangement copolymers," RSC Advances, Apr. 2021, 11(22):13164-13174, 11 pages.

Hamciuc et al., "Poly(1,3,4-oxadiazole-imide)s and their polydimethlsiloxane-containing copolymers," European Polymer Journal, Oct. 2007, 43(11):4793-4749, 11 pages.

Sanaeepur et al., "Polymides in membrane gas separation: monomer's molecular design and structural engineering," Progress in Polymer Science, Apr. 2019, 91, 154 pages.

PCT International Search Report and Written Opinion in International Appln. No. PCT/US2022/012339, dated May 9, 2022, 14 pages.

* cited by examiner

US 11,896,936 B2

POLY(IMIDE-OXADIAZOLE) MEMBRANES FOR GAS SEPARATION APPLICATIONS

TECHNICAL FIELD

The present disclosure is directed to polymers for gas separation membranes. More specifically, the polymers include polymers based on poly(imide-oxadiazole) for use in gas purification technologies.

BACKGROUND

Natural gas supplies 22% of the energy used worldwide, and makes up nearly a quarter of electricity generation. Further, natural gas is an important feedstock for the petrochemicals industry. According to the International Energy Agency (IEA), the worldwide consumption of natural gas is projected to increase from 120 trillion cubic feet (Tcf) in the year 2012 to 203 Tcf by the year 2040.

Raw, or unprocessed, natural gas is formed primarily of methane ($CH_4$), however it may include significant amounts of other components, including acid gases (carbon dioxide ($CO_2$) and hydrogen sulfide ($H_2S$)), nitrogen, helium, water, mercaptans, and heavy hydrocarbons ($C_{3+}$), among other components. These contaminants must be removed during gas processing in order to meet the standard pipeline specifications of sales gas. In particular, the removal of acid gases ($CO_2$ and $H_2S$) has been a significant research topic due to the problematic effects of acid gases on natural gas heating value, pipeline transportability, and pipeline corrosion in the presence of water.

Currently, the majority of gas processing plants remove $CO_2$ and $H_2S$ from natural gas by absorption technology, such as amine adsorption. However, several drawbacks are associated with this technology, including energy usage, capital cost, maintenance requirements, and the like.

SUMMARY

An embodiment described in examples herein provides a gas separation membrane. The gas separation membrane including a poly(imide-oxadiazole) polymer including an oligomer having a structure including:

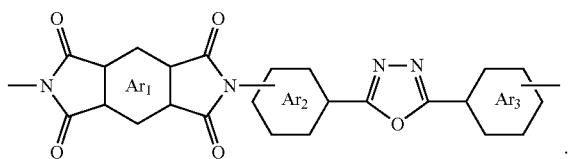

In this structure, $Ar_1$, $Ar_2$, and $Ar_3$ include aromatic moieties, and $Ar_1$, $Ar_2$, and $Ar_3$ are each independently selected.

Another embodiment described in examples herein provides a method for forming a gas separation membrane. The method includes, obtaining a diamine oxadiazole monomer, obtaining an imide monomer, and reacting the diamine oxadiazole monomer with the imide monomer to form a polymer. The polymer is dissolved in a solvent to form a polymer solution. A dense film is formed from the polymer solution. The dense film is tried to form the gas separation membrane.

DETAILED DESCRIPTION

As separation technologies advance, the use of polymeric membrane-based technology for gas separation has been increasingly explored over the past years due to the potential for energy efficiency, small footprint, and low capital cost. Although current membrane technology does not outperform absorption systems, hybrid systems using absorption and membranes have proved to be a potentially attractive alternative. For membrane systems, it is desirable to have polymeric membranes with improved separation performance.

Polymeric membranes are thin semipermeable barriers that selectively separate some gas compounds from others. Generally, polymeric membranes do not operate as a filter, where small molecules are separated from larger ones through a medium with pores, rather it separates based on how well different compounds dissolve into the membrane and diffuse through it, for example, using a solution-diffusion model.

Numerous polymeric membranes for gas separation have been developed in the decades, but few are currently commercialized for use in sour gas separation applications. Examples of polymeric materials used to form gas separation membranes include cellulose acetate (CA), polyimides (PI), and perfluoropolymers, such as polytetrafluoroethylene (PTFE), perfluorocycloalkene (PFCA), and the like. These polymeric materials are generally semi-crystalline polymers having a $T_g$ of greater than about 100° C.

One of the main characteristics used to select and modify polymeric materials is the chemical structures. Various classes of polymers were studied for this purpose. For example, polyimides and polyoxadiazoles have been studied for potential application in gas separation, such as sour mixed-gas separation. A successful candidate would be able to form membranes with high $CO_2$ and $H_2S$ permeability coefficients with high to moderate $CO_2/CH_4$ and $H_2S/CH_4$ selectivity coefficients, while withstanding the harsh chemical, physical, and thermal conditions encountered during the purification of natural gas.

Embodiments described in examples herein provide a new hybrid material that combines the advantages of polyimides and polyoxadiazoles in one material, which is called poly (imide-oxadiazole). This material could be under the form of a homopolymer, random copolymer, or block copolymer.

The chemical structure of poly(imide-oxadiazole) contains two different types of rings to link the constituting monomers an imide ring and oxadiazole ring. The preparation the poly(imide-oxadiazole) generally includes two main steps. To begin, an oxadiazole ring is formed within a diamine monomer, and then a polycondensation reaction between the oxadiazole diamine monomer with a dianhydride monomer is used to form the imide ring in a later stage.

Figure 1A:
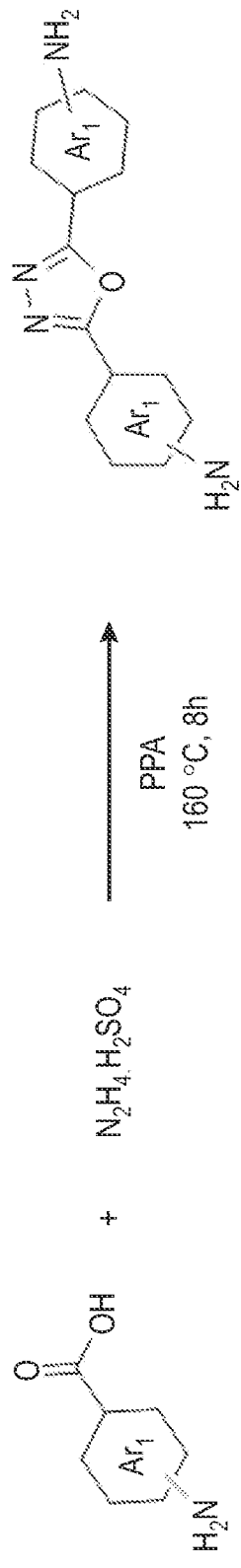
FIGS. 1A and 1B are reactions scheme for the preparation of symmetric and asymmetric diamine oxadiazole monomers.
Figure 1B:
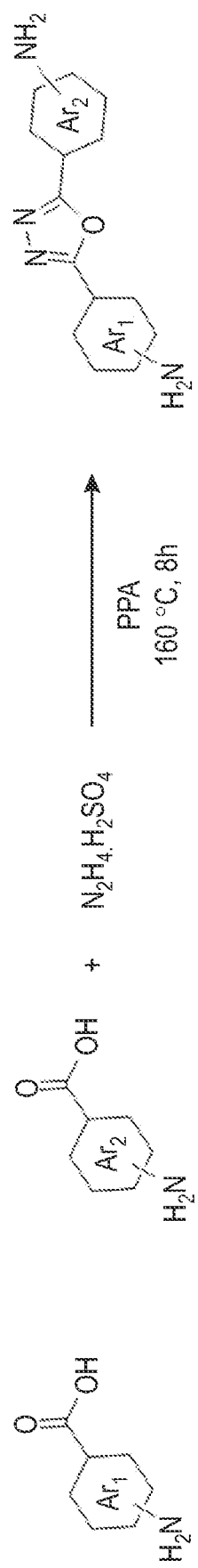

FIGS. 1A and 1B are reactions scheme for the preparation of symmetric and asymmetric diamine oxadiazole monomers. The synthetic methodology allows the preparation of a large variety of new polymers, including but not limited to, homopolymers, random copolymers, block copolymers, terpolymers, and so on. The change can be implemented at every stage of the preparation of the polymer. For example, during the preparation of the oxadiazole diamine monomer, a variety of aminobenzoic acid derivatives could be used, as shown in FIGS. 1A and 1B.

As shown in FIGS. 1A and 1B, to form an diamine oxadiazole monomer, an aromatic structure having a carboxylic acid and an amine group, such as para-aminobenzoic acid, among many others, is reacted with hydrazine sulfate, $N_2H_4 \cdot H_2SO_4$ at elevated temperatures, using polyphosphoric acid (PPA) as solvent. Two different aromatic structures may be used to form an asymmetric diamine oxadiazole monomer. For example, amino benzoic acid structures that may be used to form the diamine oxadiazole monomer in embodiments include:

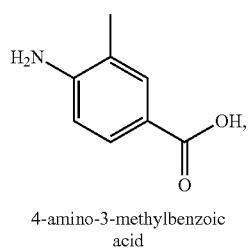

4-amino-3-methylbenzoic acid

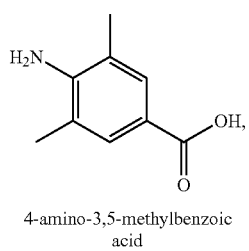

4-amino-3,5-methylbenzoic acid

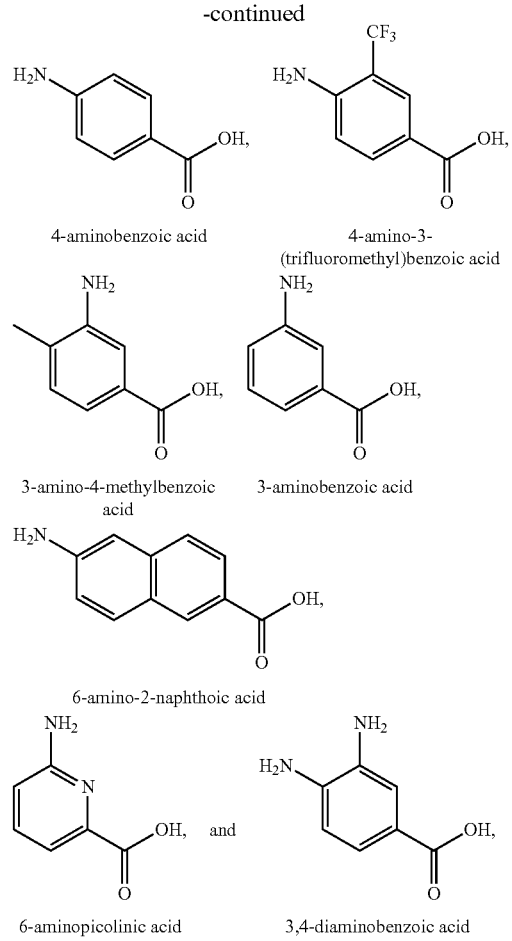

among others.

Symmetric diamine oxadiazole monomer structures that may be formed in embodiments include:

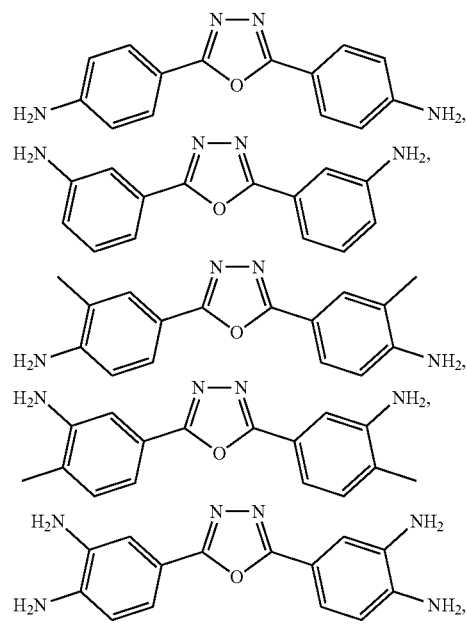

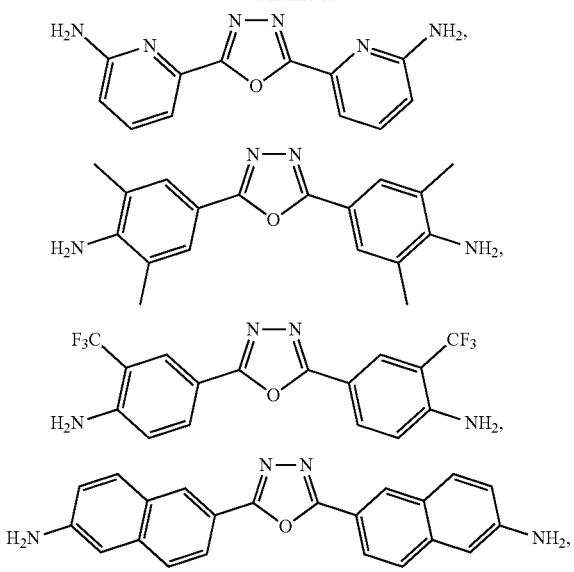

among others.

Asymmetric structures may include any combinations of the benzoic acid precursors above, among many others. Examples of asymmetric structures include:

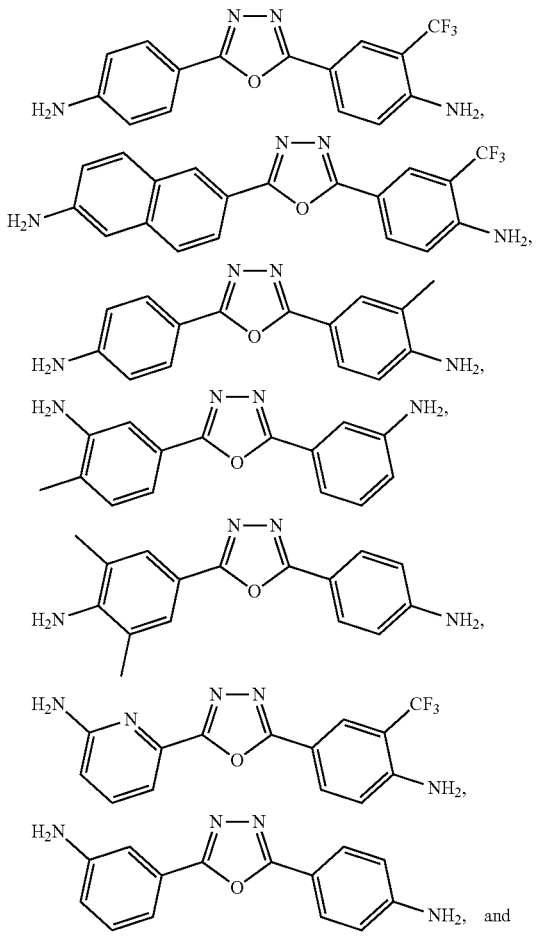

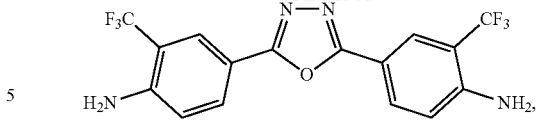

among others.

Figure 2:
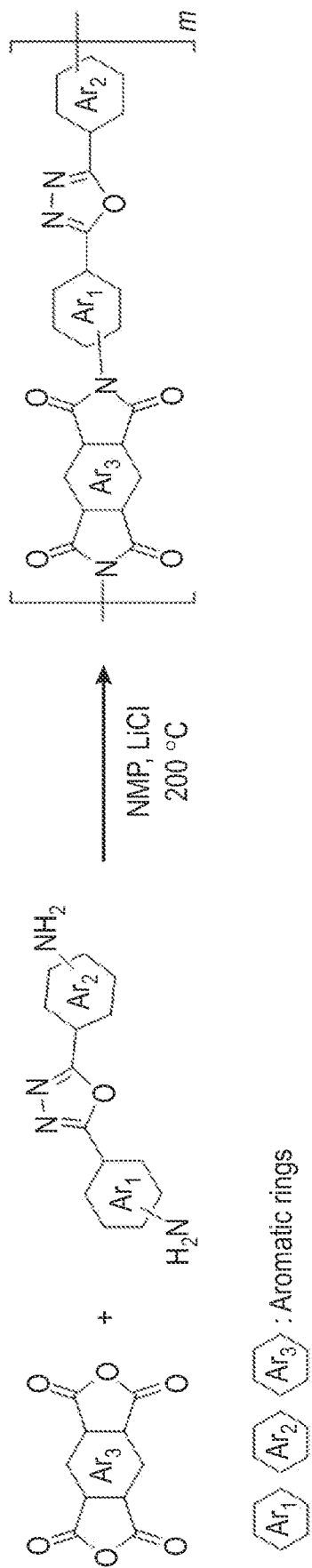
FIG. 2 is a reaction scheme for the preparation of poly (imide-oxadiazole) homopolymers.

The symmetric ($Ar_1=Ar_2$) or the asymmetric ($Ar_1 \neq Ar_2$) diamine oxadiazole monomers disclosed in here could be combined with a variety of dianhydride monomers to form poly(imide-oxadiazole) homopolymers as shown in the general schematic in FIG. 2.

FIG. 2 is a reaction scheme for the preparation of poly (imide-oxadiazole) homopolymers. The reaction may be carried out in n-methyl pyrrolidone (NMP) at an elevated temperature (180° C.-200° C.) using LiCl as a catalyst. Other solvents may be used, such as m-cresol and dimethylacetamide (DMAc), and alternative catalysts system could be used, such as $CaCl_2$), $MgCl_2$, and $ZnCl_2$. Polymers in various embodiments can be formed from any combinations of imide monomers, including, for example:

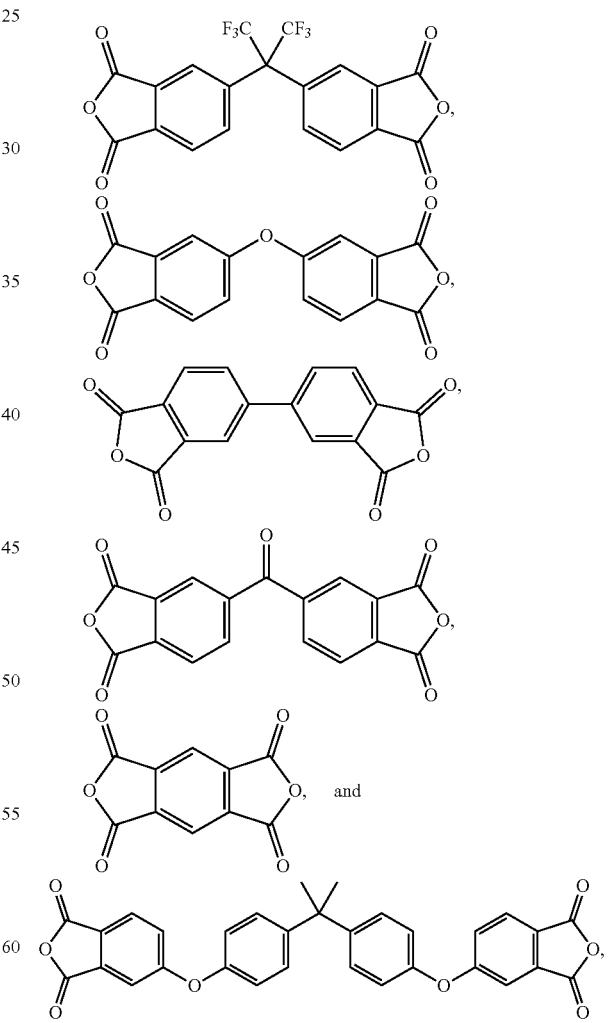

among others.

Any number of polymers can be formed from combinations of these monomers, including, for example:

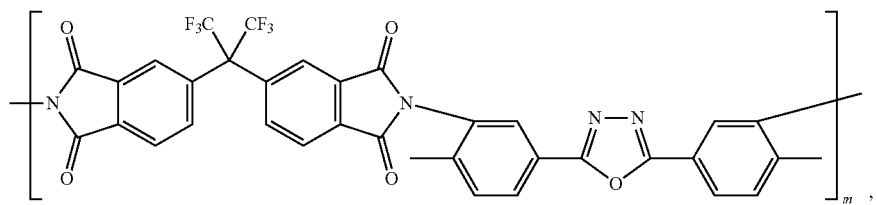
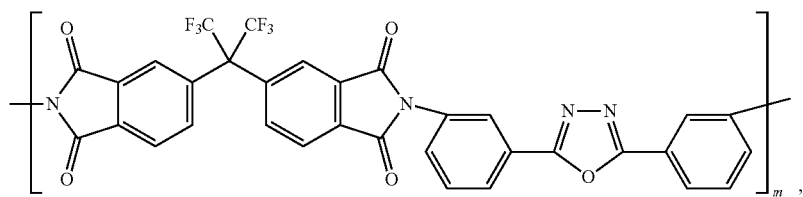
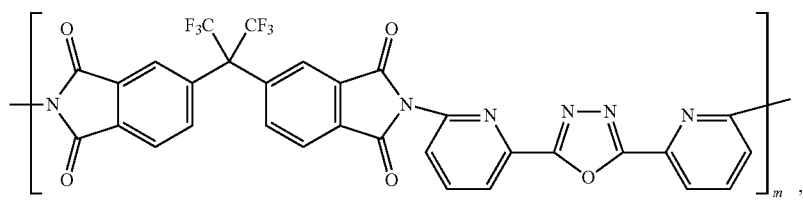
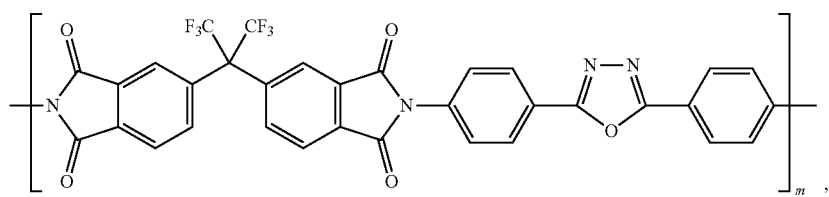
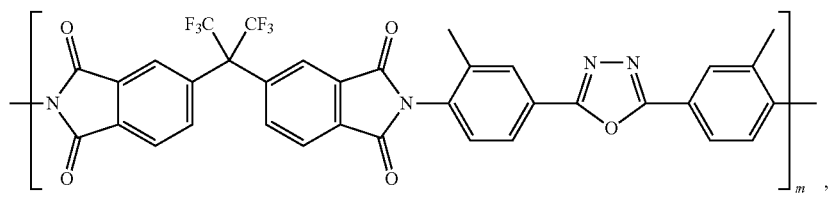
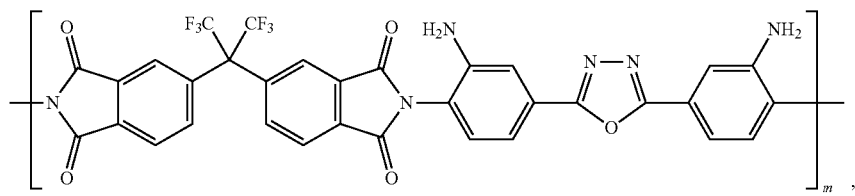
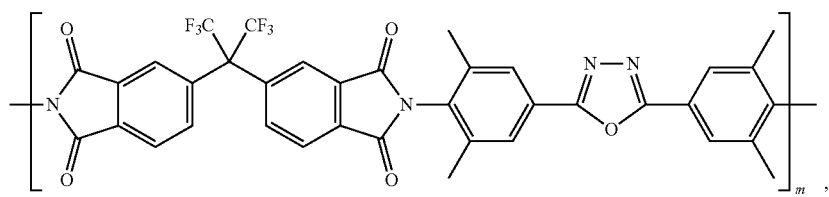
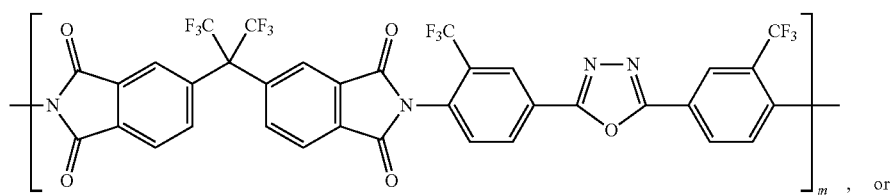, or

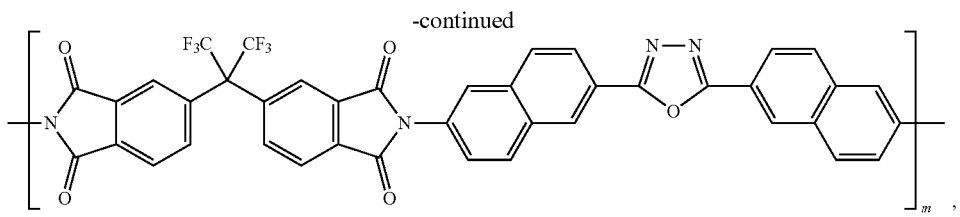

among many others.

Other changes could be employed through using the symmetric ($Ar_1=Ar_2$) or the asymmetric ($Ar_1 \neq Ar_2$) diamine oxadiazole monomers disclosed in here with a large combination of diamine and dianhydride co-monomers widely commercially available or that could be prepared, to form random or block copolymers with different molar ratios of the various co-monomers forming the copolymers.

Figure 3:
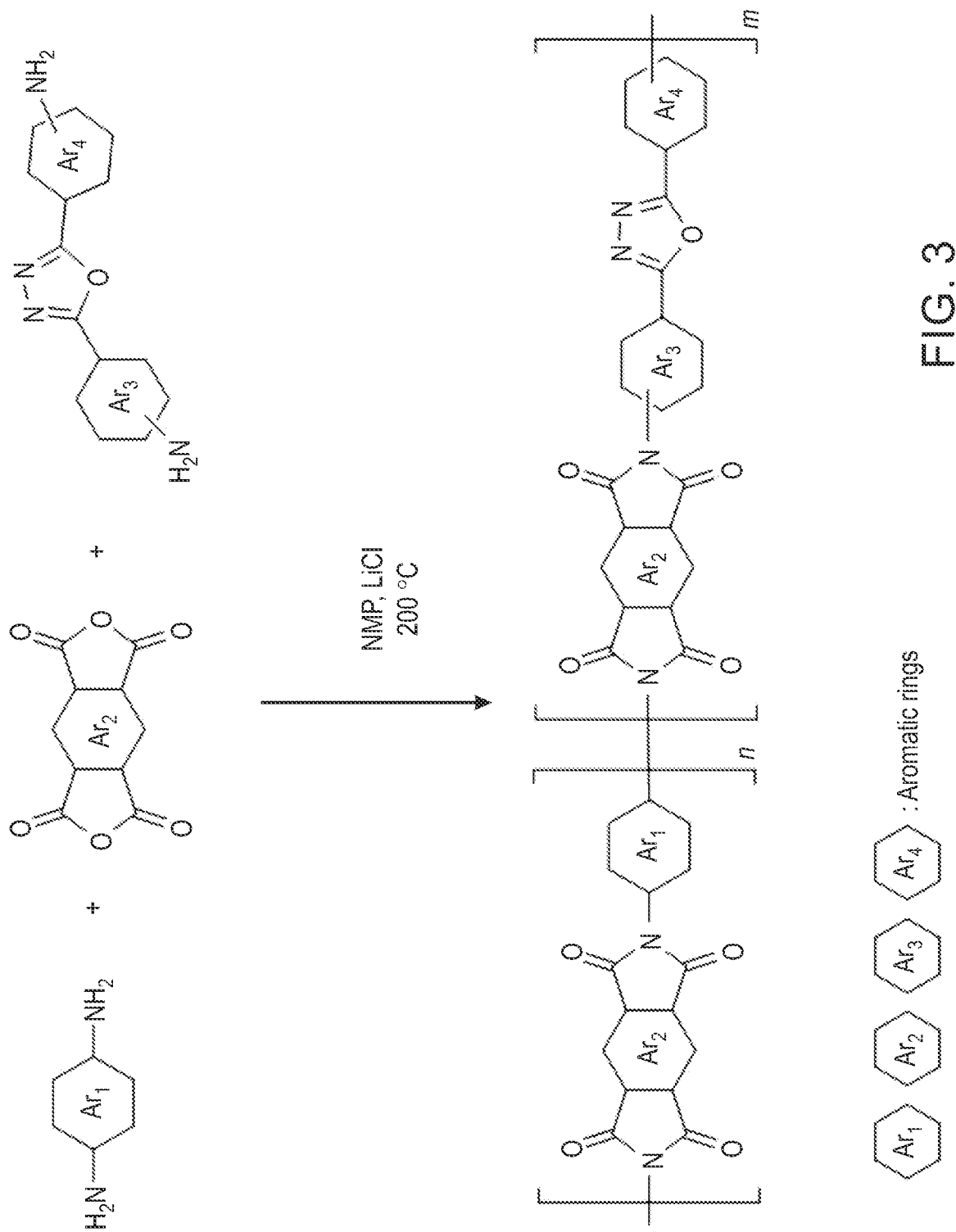
FIG. 3 is a reaction scheme for the preparation of random or block poly(imide-oxadiazole) copolymers.

FIG. 3 is a reaction scheme for the preparation of random or block poly(imide-oxadiazole) copolymers. In this example, an aromatic diamine is combined with the monomers described above to provide two different oligomeric structures further control over the properties. The aromatic diamine may include any of the following structures:

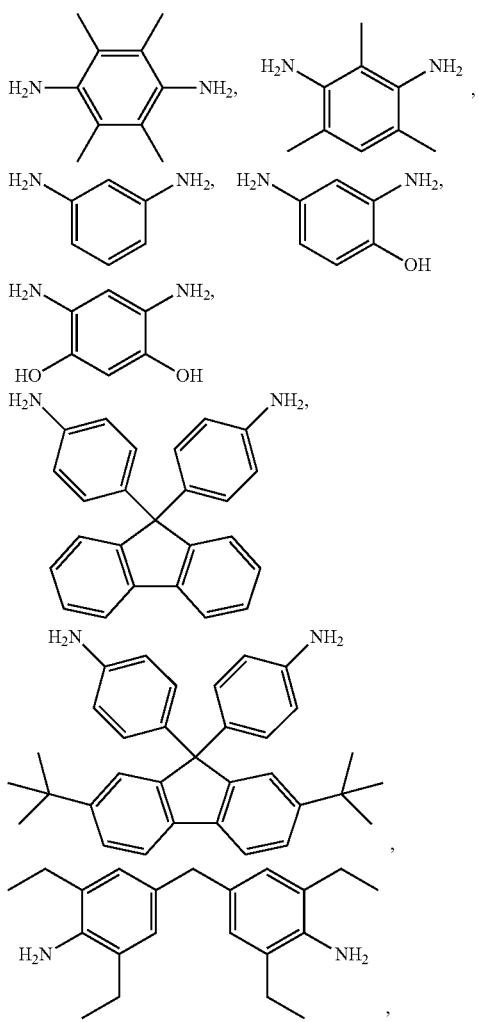

among many others

As described herein, the synthetic methodology allows the preparation of a large variety of new polymers, including but not limited to, homopolymers, random copolymers, block copolymers, terpolymers, and so on. The change can be implemented at every stage of the preparation of the polymer. For example, during the preparation of the oxadiazole diamine monomer, a variety of aminobenzoic acid derivatives could be used. The polymers allow the development of polymer membranes with high acid gas permeability coefficients against methane, while maintaining a good selectivity coefficient, which makes this kind of materials attractive for potential use in natural gas purification.

EXAMPLES

Materials

All materials listed in this work were used as received. Polyphosphoric acid (PPA, ≥83% phosphate as $P_2O_5$ basis), and 4-aminobenzoic acid (reagent plus, ≥99%) were purchased from Sigma-Aldrich, USA. 4,4'-(hexa-fluoroisopropylidene)diphthalic anhydride (6FDA, 99.0%), and hydrazine sulfate (ACS reagent, ≥99.0%) were acquired from Alfa Aesar. 1-methyl-2-pyrrolidinone (NMP, biotech grade, ≥99.7%) was purchased from Honeywell. Lithium chloride (reagent grade) was obtained from Matheson Coleman & Bell Manufacturing Chemists. 2,3,5,6-tetramethylbenzene-1,4-diamine (Durene; purity 98.0%) was obtained from TCI America. Methanol (98.0%) was purchased from Fisher Scientific and sodium hydroxide (≥98.0%) from Fluka.

Membrane Fabrication

The polymeric membranes studied in this work were prepared using the solution casting method. Solutions with concentration of 3 wt. % polymer in N,N-dimethylformamide (DMF) were prepared. Then, 11 mL of the solution were filtered through a 0.45 μm PTFE filter to remove any possible solid impurities and poured into a leveled 5.5 cm diameter flat glass Petri dish. The casting dish was placed in a preheated oven at 90° C., under a gentle flow of nitrogen to allow a slow evaporation of the solvent. After 24 hours, the obtained membrane was further dried at 180° C. under vacuum for another 24 hours. If needed, the membrane was peeled off from the Petri dish using deionized water and dried at 100° C. under vacuum for 12 hours. The thickness of the prepared membranes was determined in the range of 60-120 μm; noting that for an individual membrane, the standard deviation of thickness uniformity was less than 3%.

Characterization Techniques

Proton Nuclear Magnetic Resonance Spectroscopy ($^1$H-NMR)

The $^1$H-NMR spectra of the prepared polymers and monomers were recorded using a JEOL 500 MHz NMR spectrometer in deuterated chloroform ($CHCl_3$-d) or dimethyl sulfoxide (DMSO-$d_6$) accordingly.

Fourier Transform Infra-Red Spectroscopy (FTIR)

The Fourier Transform Infrared (FTIR) spectra were recorded using a Thermo Scientific Nicolet iS50 spectrometer in transmission mode. Samples could be of the form of powder solid or membrane.

Thermogravimetric Analysis (TGA) and Glass Transition Temperature ($T_g$)

The thermogravimetric analysis (TGA) plots and the differential scanning calorimetry (DSC) traces were performed using a NETZSCH STA 449 F3 Jupiter®. The TGA plots were recorded at a temperature range from 30° C. to 650° C. with a heating rate of 10° C./min under a nitrogen atmosphere. The glass transition temperature ($T_g$) was determined from the DSC traces over two consecutive cycles. Each cycle consists of heating the sample at a temperature range between 30° C. and 450° C., using a heating rate of 10° C./min under a nitrogen flow. The first run is aimed to clear the thermal history of the sample, and the $T_g$ values were determined after the second cycle.

Syntheses of Monomers and Polymers

Example 1: Preparation of
4,4'-(1,3,4-oxadiazole-2,5-diyl)dianiline (BAO)

Figure 4:
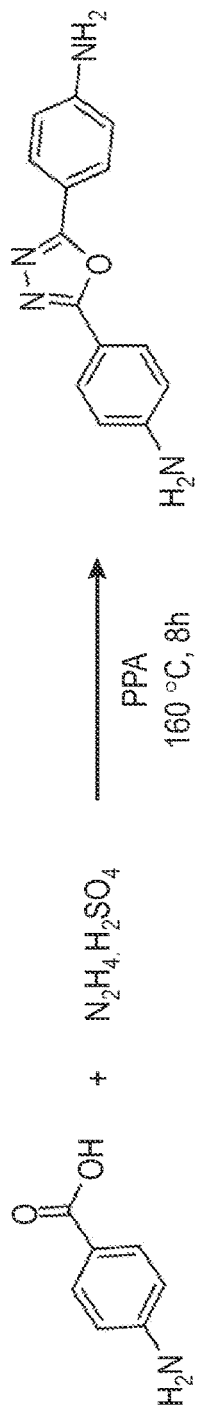
FIG. 4 is a reaction scheme for the preparation of the diamine oxadiazole monomer 4,4'-(1,3,4-oxadiazole-2,5-diyl)dianiline (termed BAO).

FIG. 4 is a reaction scheme for the preparation of the diamine oxadiazole monomer 4,4'-(1,3,4-oxadiazole-2,5-diyl)dianiline (termed BAO). In a 250-ml three-neck round bottom flask equipped with a nitrogen inlet and a mechanical stirrer, polyphosphoric acid PPA (41.26 ml; 85 g; d=2.06 g/mL; weight ratio PPA/hydrazine sulfate=15) was introduced to the reaction vessel and heated to 100° C. with vigorous stirring for one hour to remove traces of moisture from the solvent. Hydrazine sulfate (5.69 g, 43.8 mmol) was then added to the reaction vessel and the mixture was heated to 160° C. until the solid was completely dissolved, then 4-aminobenzoic acid (5 g, 36.5 mmol) was added and the reaction mixture was stirred for additional 8 hours at the same temperature. The reaction mixture was precipitated in a 1M NaOH aqueous solution. The solid obtained through vacuum filtration using a fritted funnel, was then transferred to deionized water and the mixture was further stirred at 80° C. overnight. The solid was then collected through filtration and dried in a vacuum oven at 100° C. for 24 hours. The final monomer 4,4'-(1,3,4-oxadiazole-2,5-diyl)dianiline (4.00 g, 15.86 mmol, 36.2% yield) was then crystallized from 1,4-dioxane as yellow solid. $^1$H NMR (500 MHz, DMSO-$d_6$) δ 7.71 (d, J=8.2 Hz, 4H), 6.68 (d, J=8.2 Hz, 4H), 5.87 (s, 4H)

Example 2: Preparation of 5-(2-(1,3-dioxo-2-(4-(5-(p-tolyl)-1,3,4-oxadiazol-2-yl)phenyl)isoindolin-5-yl)-1,1,1,3,3,3-hexafluoropropan-2-yl)-2-methylisoindoline-1,3-dione (6FDA-BAO)

Figure 5:
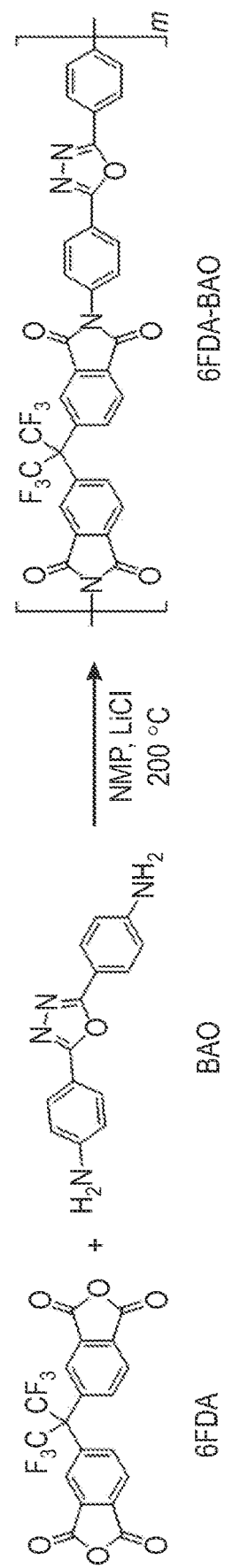
FIG. 5 is a reaction scheme for the preparation of the 6FDA-based poly(imide-oxadiazole) homopolymer, 6FDA-BAO.

FIG. 5 is a reaction scheme for the preparation of the 6FDA-based poly(imide-oxadiazole) homopolymer, 6FDA-BAO. In a 100-ml three-neck round bottom flask equipped with a nitrogen inlet and a mechanical stirrer, 4,4'-(1,3,4-oxadiazole-2,5-diyl)dianiline (1.000 g, 3.96 mmol) (BAO) and 5,5'-(perfluoropropane-2,2-diyl)bis(isobenzofuran-1,3-dione) (1.761 g, 3.96 mmol) (6FDA) were added to the reaction vessel followed by NMP (12.00 ml) and 5% LiCl (0.600 g). The mixture was heated at 200° C. for 8 hours. The heat was removed and the reaction mixture was allowed to cool down below 100° C., then the resulting highly viscous solution was poured into water in thin fibers. The fibrous polymer obtained by vacuum filtration using a fritted funnel was ground, rinsed with water, filtered and dried under reduced pressure for 24 h at 60° C. to produce the 6FDA-BAO (2.57 g, 3.73 mmol, 94% yield) as a white off powder. $^1$H NMR (500 MHz, DMSO-$d_6$) δ 8.31 (d, J=7.9 Hz, 4H), 8.22 (d, J=7.3 Hz, 2H), 8.00 (d, J=7.4 Hz, 2H), 7.81 (s, 2H), 7.76 (d, J=6.9 Hz, 4H).

Example 3: Preparation of a Random Copolymer of 6FDA-Durene/BAO (1:1)

Figure 6:
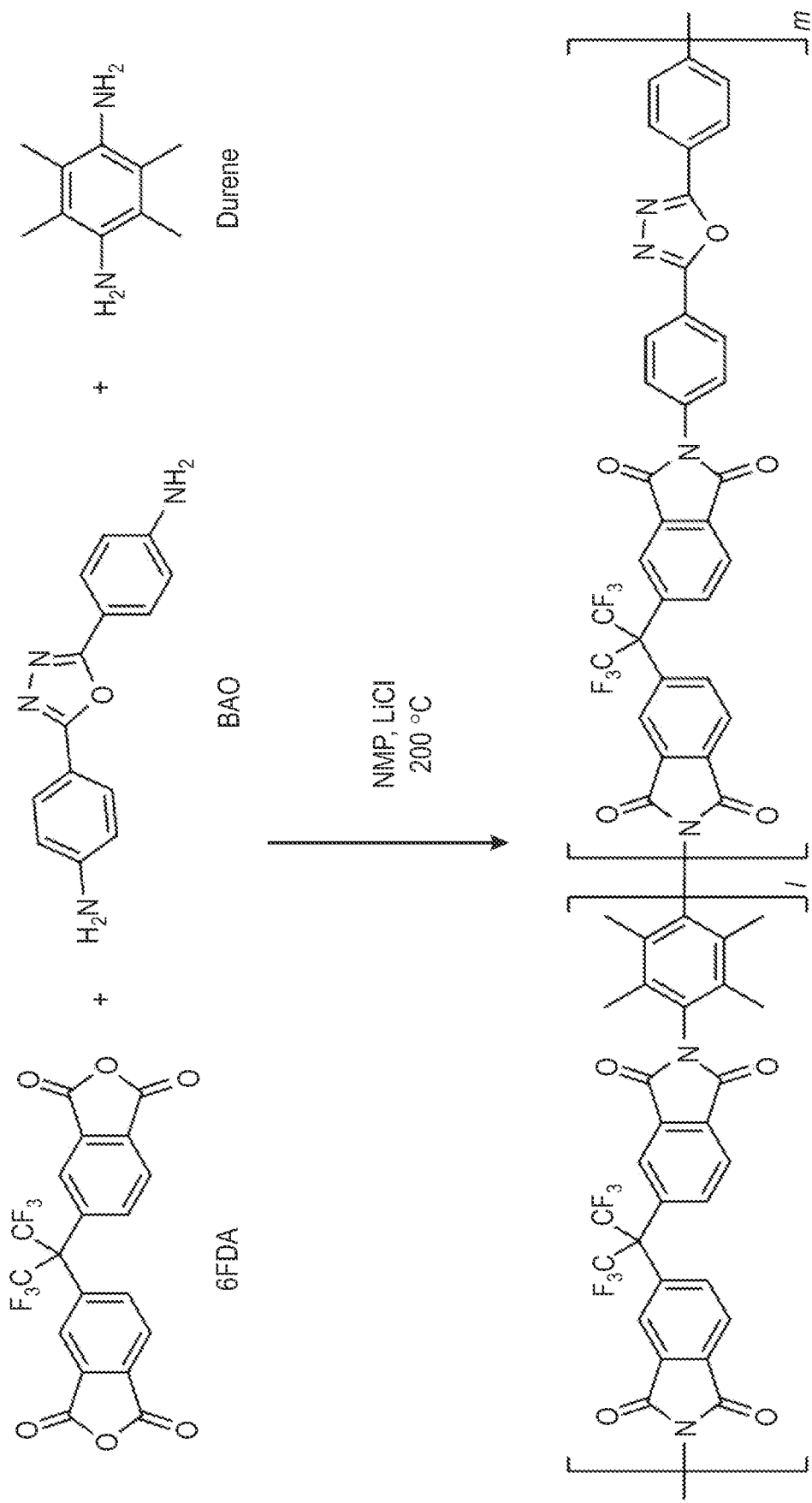
FIG. 6 is a reaction scheme for the preparation of a 6FDA-based poly(imide-oxadiazole) random copolymer, 6FDA-Durene/BAO at a 1:1 ratio of 6FDA-Durene to BAO.

FIG. 6 is a reaction scheme for the preparation of a 6FDA-based poly(imide-oxadiazole) random copolymer, 6FDA-Durene/BAO at a 1:1 ratio of 6FDA-Durene to BAO. In a 100-ml three-neck round bottom flask equipped with a nitrogen inlet and a mechanical stirrer, 2,3,5,6-tetramethylbenzene-1,4-diamine (0.326 g, 1.982 mmol) (3,6-diaminodurene), 4,4'-(1,3,4-oxadiazole-2,5-diyl)dianiline (0.500 g, 1.982 mmol) (BAO) and 5,5'-(perfluoropropane-2,2-diyl)bis(isobenzofuran-1,3-dione) (1.761 g, 3.96 mmol) (6FDA) were added to the reaction vessel followed by NMP (12.00 ml) and 5% LiCl (0.600 g). The mixture was heated at 200° C. for 8 hours. The heat was removed and the reaction mixture was allowed to cool down below 100° C., then the resulting highly viscous solution was poured into water in thin fibers. The fibrous polymer obtained was ground, rinsed with water, filtered and dried under reduced pressure for 24 h at 60° C. to afford 6FDA-Durene/BAO (1:1) (2.378 g, 1.883 mmol, 95% yield) as an off-white powder. $^1$H NMR (500 MHz, DMSO-$d_6$) δ 8.46-7.49 (m, 20H), 2.07 (s, 12H).

Example 4: Preparation of 6FDA-Based Poly(Imide-Oxadiazole) Random Copolymer: 6FDA-Durene/BAO (3:1)

The reaction scheme of FIG. 6 was also used to prepare a random copolymer of 6FDA-Durene/BAO at a 3:1 ratio.

In a 100-ml three-neck round bottom flask equipped with a nitrogen inlet and a mechanical stirrer, 2,3,5,6-tetramethylbenzene-1,4-diamine (0.488 g, 2.97 mmol) (3,6-diaminodurene), 4,4'-(1,3,4-oxadiazole-2,5-diyl)dianiline (0.250 g, 0.991 mmol) (BAO) and 5,5'-(perfluoropropane-2,2-diyl)bis(isobenzofuran-1,3-dione) (1.761 g, 3.96 mmol) (6FDA) were added to the reaction vessel followed by NMP (12.00 ml) and 5% LiCl (0.600 g). The mixture was heated at 200° C. for 8 hours. The heat was removed and the reaction mixture was allowed to cool down below 100° C., then the resulting highly viscous solution was poured into water in thin fibers. The fibrous polymer obtained was ground, rinsed with water, filtered and dried under reduced pressure for 24 h at 60° C. to afford 6FDA-Durene/BAO (3:1) (2.378 g, 1.883 mmol, 95% yield) as a white off powder. $^1$H NMR (500 MHz, Chloroform-d) δ 8.43-7.55 (m, 12H), 2.13 (s, 12H).

Chemical Characterization

The various chemical structures of the compounds prepared in this disclosure were confirmed using $^1$H NMR in deuterated solvents. Examples of the spectra for these compounds are illustrated below.

Figure 7:
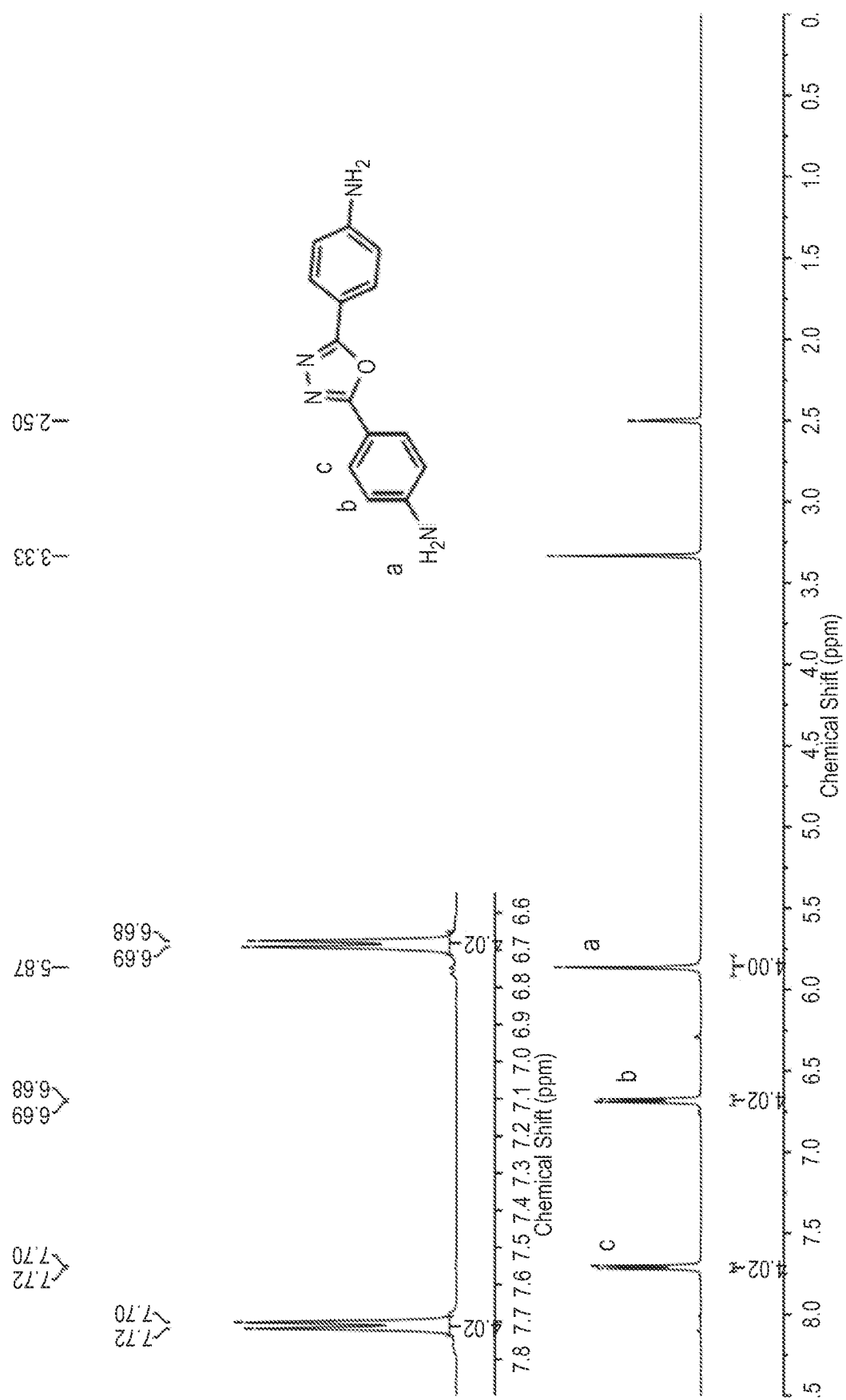
FIG. 7 is a $^1H$ NMR spectrum of 4,4'-(1,3,4-oxadiazole-2,5-diyl)dianiline (BAO) in DMSO-$d_6$.

FIG. 7 is a $^1$H NMR spectrum of 4,4'-(1,3,4-oxadiazole-2,5-diyl)dianiline (BAO) in DMSO-$d_6$. The chemical structure of the diamine oxadiazole monomer was confirmed by $^1$H NMR in deuterated DMSO. The spectrum depicts the aromatic protons corresponding to the benzene rings as two duplets at 7.71 and 6.68 ppm, and the amine protons are illustrated in a singlet peak at 5.87 ppm. The spectrum shows the symmetry within the structure of the monomer, in addition to the high purity of the solid obtained.

Figure 8:
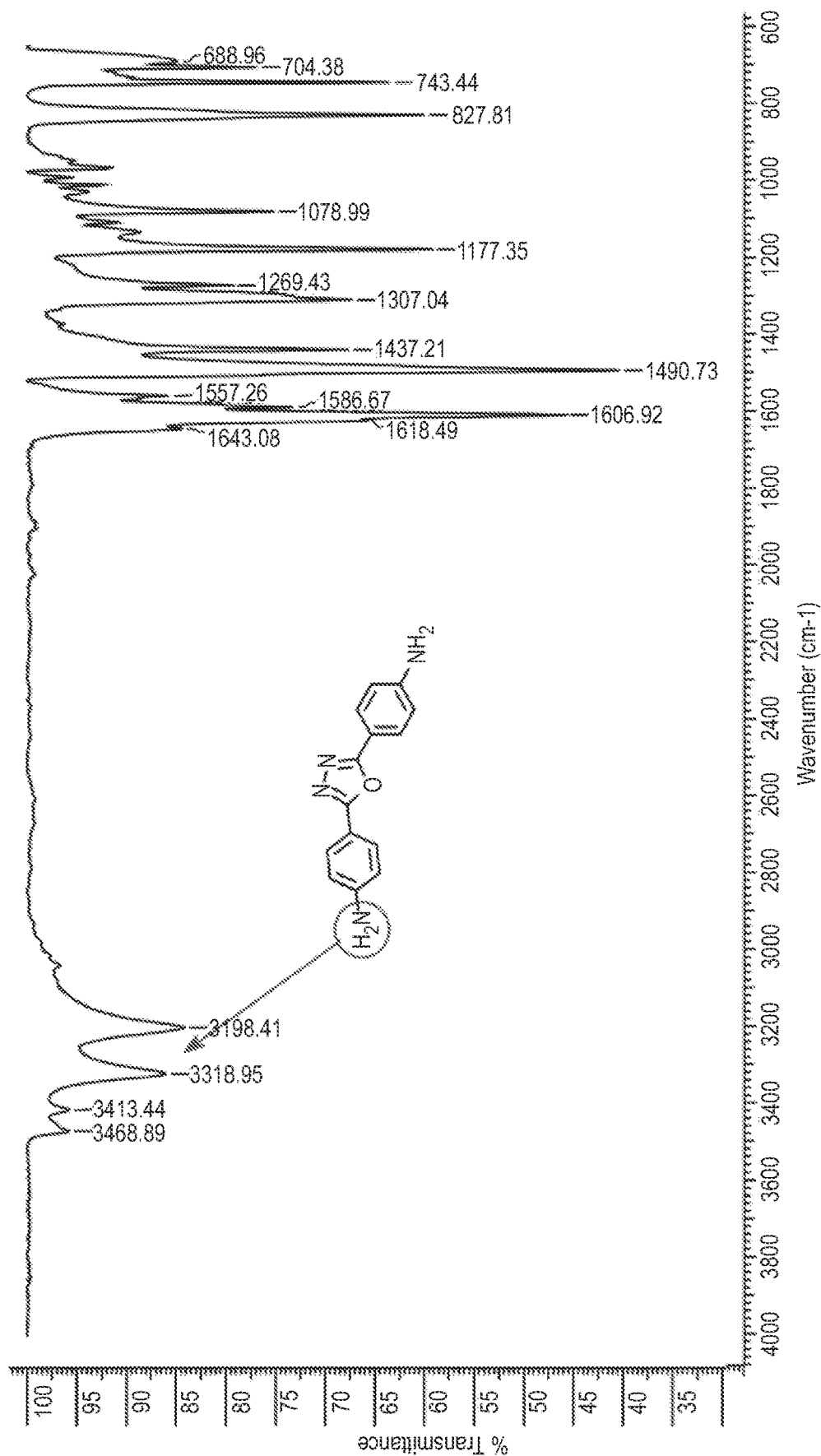
FIG. 8 is a Fourier transform infrared (FTIR) spectrum of 4,4'-(1,3,4-oxadiazole-2,5-diyl)dianiline (BAO).

FIG. 8 is a Fourier transform infrared (FTIR) spectrum of 4,4'-(1,3,4-oxadiazole-2,5-diyl)dianiline (BAO). The presence of the functional groups within the structure of the BAO monomer, such as free primary amine groups were confirmed using Fourier transform infrared (FTIR) spectroscopy. The primary amine stretching bands are illustrated between 3198 and 3468 cm$^{-1}$. The stretching bands for the C=N of the oxadiazole ring and C=C of the phenyl groups could be found at around 1600 cm$^{-1}$. The stretching band at 1177 cm$^{-1}$ could be attributed to the ether (C—O—C) bond in the oxadiazole ring. The peaks between 700 and 900 cm$^{-1}$ could be attributed to the aromatic C—H bonds.

Figure 9:
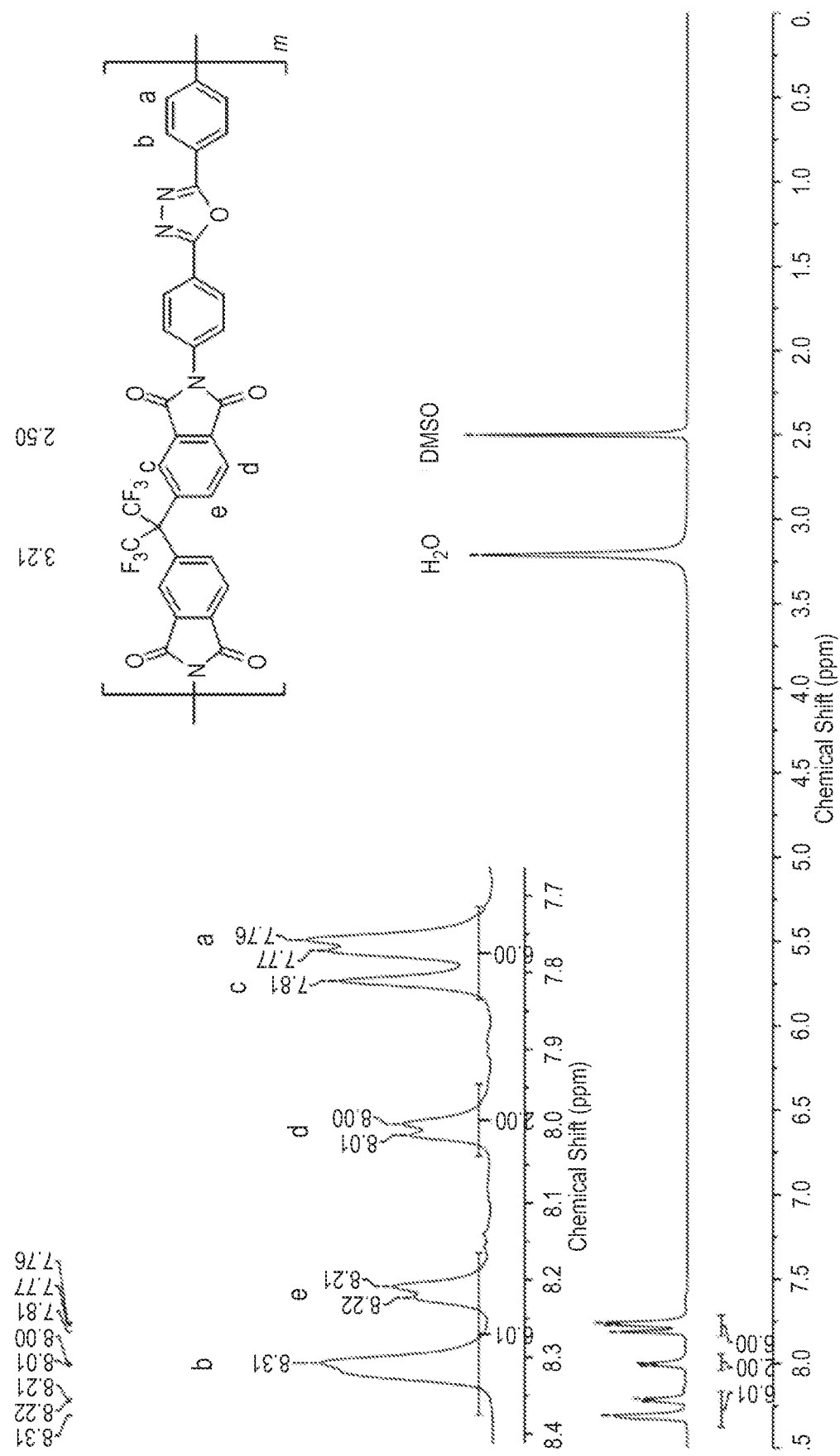
FIG. 9 is a $^1H$ NMR spectrum of 6FDA-BAO homopolymer in DMSO-$d_6$.

FIG. 9 is a $^1$H NMR spectrum of 6FDA-BAO homopolymer in DMSO-$d_6$. The chemical structure of the 6FDA-BAO homopolymer was confirmed by $^1$H NMR in deuterated DMSO. The spectrum illustrates the corresponding peals of 6FDA moiety as two duplet and one singlet at 8.21, 8.00 and 7.81 ppm, respectively, and the corresponding peaks for BAO as two duplets at 8.31 and 7.76 ppm, respectively. Moreover, the spectrum illustrates the high purity of the polymer prepared.

Figure 10:
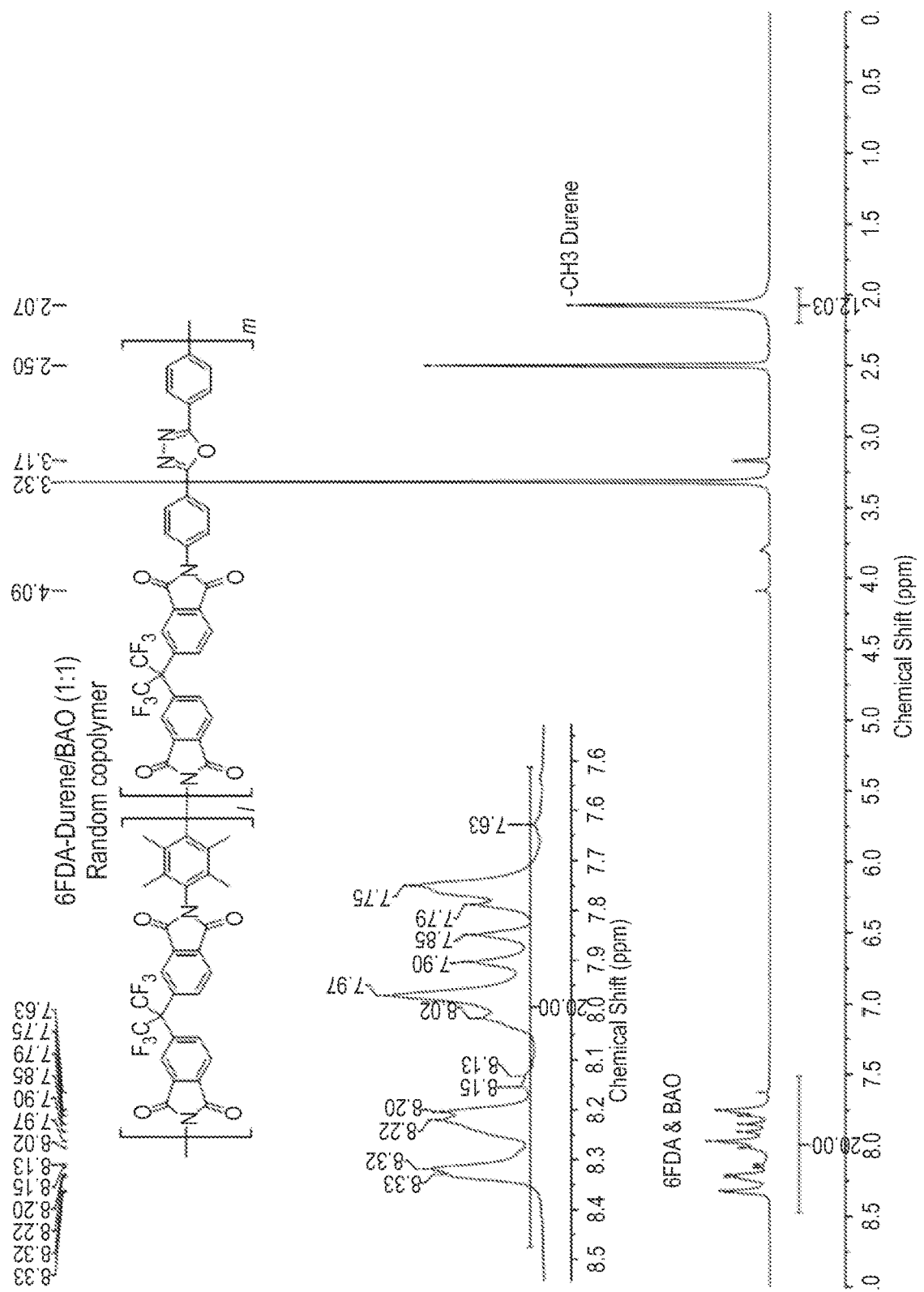
FIG. 10 is a $^1H$ NMR spectrum of 6FDA-Durene/BAO (1:1) random copolymer in DMSO-$d_6$.

FIG. 10 is a $^1$H NMR spectrum of 6FDA-Durene/BAO (1:1) random copolymer in DMSO-$d_6$. The chemical structure and the desired molar ratio between the durene moiety and BAO monomer in the 6FDA-Durene/BAO (1:1) random copolymer were confirmed by $^1$H NMR in deuterated DMSO. The integration of the peak areas confirms the ratio between the aromatic and aliphatic regions in the spectrum. For instance, the durene diamine monomer does not have aromatic protons. However, it possesses 12 aliphatic protons that correspond to its four-methyl groups. The aromatic region shows a total of 20 protons that could be distributed as follows: eight aromatic protons for BAO, six aromatic protons for 6FDA connected to BAO, and six aromatic protons for 6FDA connected to the durene moiety. Similarly, the molar ratio between the durene moiety and BAO monomers in 6FDA-Durene/BAO (3:1) random copolymer was confirmed using the corresponding $^1$H NMR spectrum.

Thermal and Physical Properties

Figure 11A:
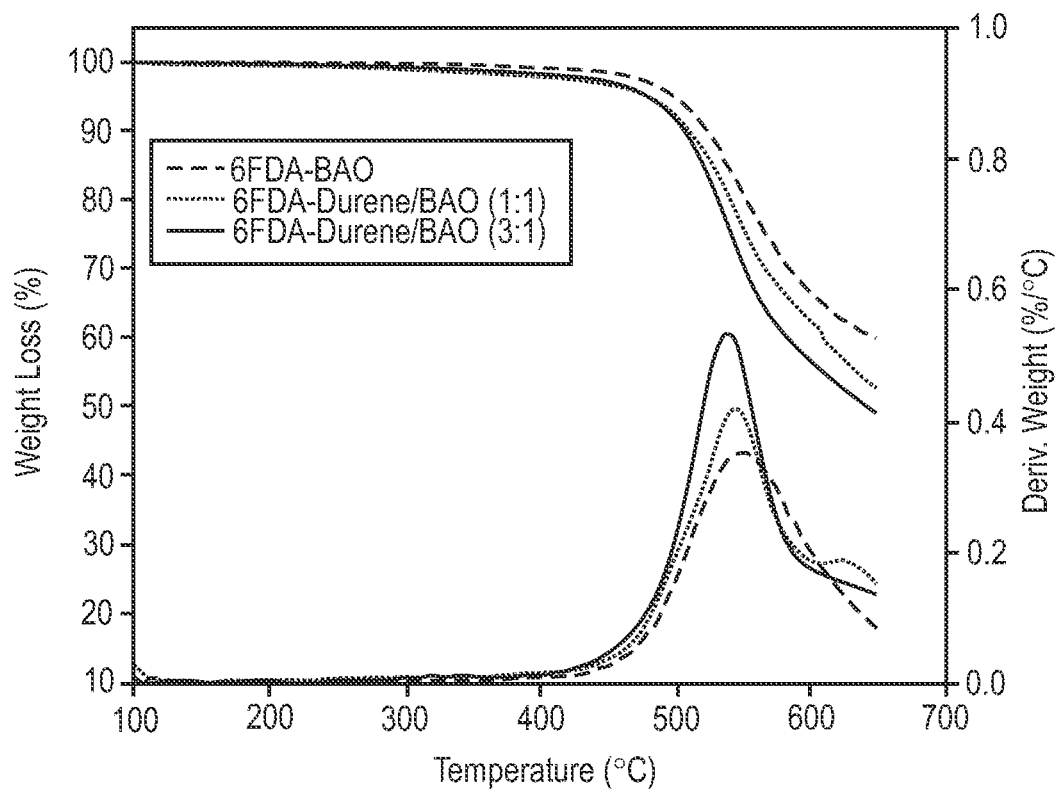
FIG. 11A is a plot of thermogravimetric analysis (TGA) curves of the prepared polymers.
Figure 11B:
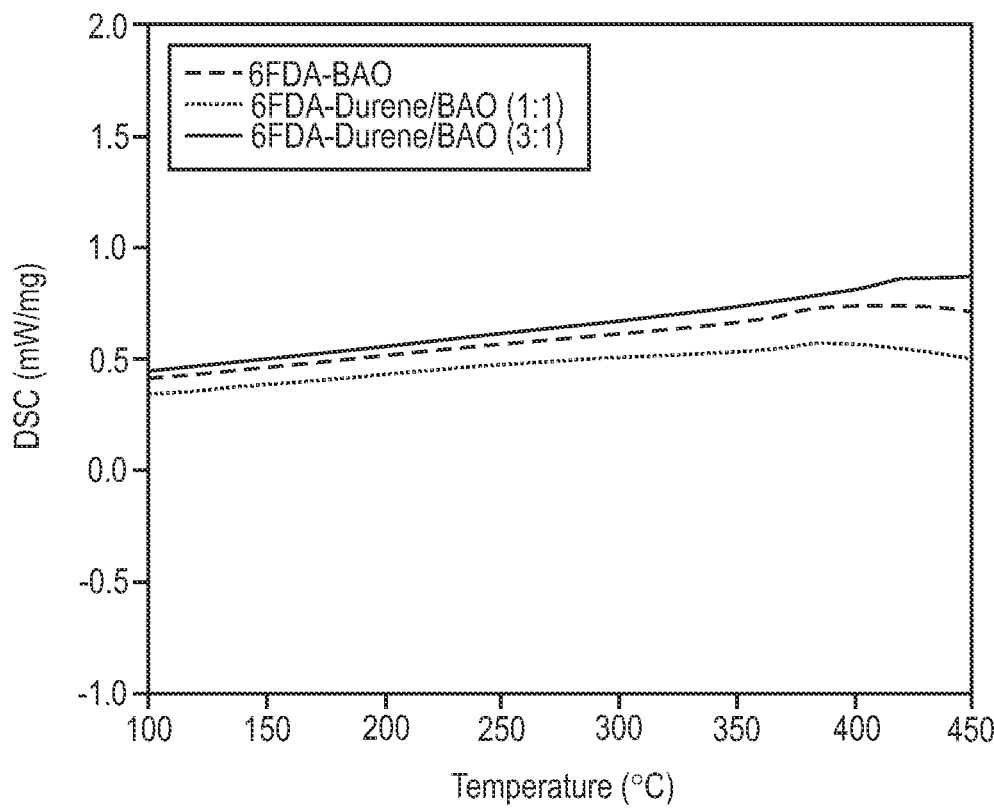
FIG. 11B is a plot of the first derivatives of the DSC curves (DTG) of the prepared polymers.

The thermal properties of the prepared polymers were measured using thermal gravimetric analysis (TGA) and differential scanning calorimetry (DSC) and the results are illustrated in FIGS. 11A and 11B.

FIG. 11A is a plot of thermogravimetric analysis (TGA) curves of the prepared polymers. FIG. 11B is a plot of the first derivatives of the DSC curves (DTG) of the prepared polymers. The decomposition temperatures at 5% and 10% were determined (Table 1) to assess the thermal stability of the prepared polymers during the harsh conditions of gas separation tests. The $T_{d5\%}$ of the prepared polymers were found to be higher than 480° C., which is similar to high thermally stable membranes used in gas separation technology. The first derivatives of the TGA curves were calculated and the values are listed in Table 1. These values (>538° C.) indicate the highest temperature at which the polymer degrades the fastest, are additional indication to the high thermal stability of the prepared polymers.

The glass transition temperatures ($T_g$) of the prepared polymers were calculated from their corresponding DSC traces and the values are listed in Table 1. These temperatures are indicative of the rigidity of the polymeric chains, which is somehow could be correlated to their performance during gas separation testing. The values obtained as similar to other glassy polymers used in gas separation technology.

TABLE 1

Thermal properties of the prepared polymers.

| | DSC | TGA | | |
|---|---|---|---|---|
| Poly(imide-oxadiazole) sample | $T_g$ (° C.) | $T_{d5\%}$ (° C.) | $T_{d10\%}$ (° C.) | DTG (° C.) |
| 6FDA-BAO | 374 | 500 | 521 | 551 |
| 6FDA-Durene/BAO (1:1) | 417 | 480 | 510 | 543 |
| 6FDA-Durene/BAO (3:1) | 379 | 481 | 507 | 538 |

The fractional free volume (FFV) values of membranes prepared from the studied polymers were calculated using the following equation:

$$FFV = \frac{V - V_0}{V},$$

where V is the specific volume and $V_0$ is the occupied volume by the polymer. Note that V is the reciprocal of the polymer density and can be determined experimentally. The densities of the prepared polymers were measured using a Mettler Toledo XPE205 balance equipped with a density kit using cyclohexane (d=0.777 g/cm$^3$) as the buoyant liquid at 20° C. The density values reported in Table 2 are the average values of at least five different measurements, with error values (standard deviation) below 5%. The occupied volume ($V_0$) values were calculated from the van der Waals volumes ($V_w$) using Bondi's equation:

$$V_0 = 1.3 \times V_w$$

The van der Waals volumes of copolymers were calculated from the individual $V_w$ of the constituent homopolymers taking into consideration their different molar ratios in the copolymer backbone using the following equation:

$$V_w = X_1 V_{w1} + X_2 V_{w2},$$

where $X_1$ and $X_2$ are the molar ratios, and $V_{w1}$ and $V_{w2}$ are the van der Waals volumes of the constituent homopolymers. In our case, we have estimated the van der Waals volumes using a web simulation tool rather than the Bondi's group contribution method due to missing volume values within the functional groups reported.

TABLE 2

Density and fractional free volume (FFV) values of the
prepared poly(imide-oxadiazole) samples.

| Poly(imide-oxadiazole) sample | $V_0$ (cm$^3$/g) | V (cm$^3$/g) | d (g/cm$^3$) | FFV |
|---|---|---|---|---|
| 6FDA-Durene | 0.6123 | 0.7735 | 1.2929 | 0.2083 |
| 6FDA-BAO | 0.5854 | 0.6909 | 1.4473 | 0.1528 |
| 6FDA-Durene/BAO (1:1) | 0.5989 | 0.7312 | 1.3677 | 0.1810 |
| 6FDA-Durene/BAO (3:1) | 0.6056 | 0.7483 | 1.3363 | 0.1907 |

The results listed in Table 2 show a clear increase in the FFV for copolymer membranes when compared to that of 6FDA-BAO homopolymer due to the incorporation of the somewhat bulkier durene moiety. For example, the FFV value of the homopolymer 6FDA-BAO is 0.1528, and that of the 6FDA-Durene is 0.2083. The FFV of the copolymers prepared from these two monomers are between the FFV values of their constituent homopolymers. As indicated by the data listed in Table 2, the higher the molar ratio of the durene moiety in the copolymer backbone, the higher the FFV value. These results are correlated to the gas permeation results in the next section.

Dense Membrane Preparation

Dense membranes of the polymers with a thickness around 100 μm were prepared using the solution casting method in dimethyl formamide (DMF) as the solvent. A polymer solution of 3 wt. % concentration was prepared and 12 mL of this solution was filtered through a 0.45 μm Teflon filter to remove any solid particles impurities, and then transferred into a glass Petri dish of a 5 cm diameter. The Petri dish was placed on a leveled support in a vacuum oven preheated to 80° C. and the solvent was slowly evaporated under a gentle nitrogen flow. When the membrane formed (after ~36 hours), the oven temperature was increased to 180° C. and vacuum was applied to remove any traces of residual solvent within the membrane matrix. The formed membrane was cut using a 4 cm diameter cutter, for a perfect fitting into the membrane cell of the gas permeation testing system.

Pure-Gas and Mixed-Gas Permeation Measurements

Pure-Gas Permeation Measurement

The pure-gas permeation properties of the prepared polymeric membranes were measured using an in-house built constant volume/variable pressure permeation system. The membrane was placed in the permeation cell and subjected to a selected gas feed (i.e., He, $N_2$, $CH_4$ and $CO_2$) for a specific time, to reach a permeation steady-state at a constant feed pressure of 100 psi and a temperature of 22° C. The permeability coefficients (P) were calculated from the slope $$\left(\frac{dp_p}{dt}\right)_{ss}$$

of the steady state (ss) of the permeate pressure ($p_p$) versus time curve using the following equation:

$$P = 10^{10} \frac{V_d l}{p_f ART}\left[\left(\frac{dp_p}{dt}\right)_{ss} - \left(\frac{dp_p}{dt}\right)_{leak}\right] \quad (1)$$

where, $V_d$ is the permeate tube volume (cm$^3$), l is the membrane thickness (cm), $p_f$ is the gas feed pressure (cmHg), A is the membrane effective surface area (cm$^2$), R is the universal gas constant (R=0.278 cm$^3$·cmHg/cm$^3$(STP)·K), T is the operational temperature (K), $$\left(\frac{dp_p}{dt}\right)_{ss}$$

is the steady-state pressure variation in the permeate tube (cmHg), and $$\left(\frac{dp_p}{dt}\right)_{leak}$$

is the leak rate of the system, which is usually very small and may be neglected. The permeability coefficient is expressed in Barrer, where 1 Barrer=$10^{-10}$ cm$^3$(STP)·cm/cm$^2$·s·cmHg.

The ideal selectivity coefficient for two selected gases A and B is calculated from the ratio of their corresponding permeabilities (PA and PB) using the following expression:

$$\alpha_{A/B} = \frac{P_A}{P_B} \quad (2)$$

The diffusivity coefficients D (cm$^2$/s) of the gas penetrants were calculated by the time-lag method using the following expression:

$$D = \frac{l^2}{6\theta} \quad (3)$$

where θ(s) is the time-lag determined from the pure-gas permeability measurement, and l (cm) in the membrane thickness. The solubility coefficient S (cm$^3$(STP)/cm$^3$·cmHg.) can be then calculated from the permeability and diffusivity coefficients using the following equation:

$$S = \frac{P}{D} \quad (4)$$

Mixed-Gas Permeation Measurement

The permeation of gases through glassy polyimide membranes is affected by the presence of other gases in the flow. It is known that a small partial pressure of a condensable species such as $CO_2$ in the feed gas can significantly reduce the permeability of a gas relative to its permeability individually. Therefore, the competition for Langmuir sorption sites for non-plasticized polymers will lead to a decrease of all penetrants permeabilities. Moreover, the selectivity coefficients may also decrease because of bulk flow and the change on the dynamic free volume (plasticization). Therefore, the permeability of a gas i in the mixed gas permeation process is given by:

$$P_i = P_{total} \frac{y_i(p_p - p_f)}{x_i p_p - y_i p_f} \quad (5)$$

$P_{total}$ is derived from the permeability expression for mixed gas:

$$P_{total} = \frac{Jl}{\Delta p} \quad (6)$$

The selectivity coefficient ($\alpha^*_{ij}$), which is the ability of a polymeric membrane to separate a binary feed gas mixture, is defined as follows:

$$\alpha^*_{ij} = \left(\frac{y_i}{y_j}\right)\left(\frac{x_j}{x_i}\right) \quad (7)$$

where $y_i$ and $y_j$ are the mole fractions of gases i and j at the permeate side, and $x_i$ and $x_j$ are the mole fractions of gases i and j at the feed side.

To reflect the real properties of the membrane in the case of a non-ideal gas mixture, the modified expression of the selectivity ($\alpha_{ij}^{m,*}$) is represented by, $$\alpha_{ij}^{m,*} = \frac{P_i^*}{P_j^*} \quad (8)$$

where $P_i^*$ and $P_j^*$ are the mixed gas permeability coefficients of components i and j determined by the fugacity driving force definition.

Figure 12:
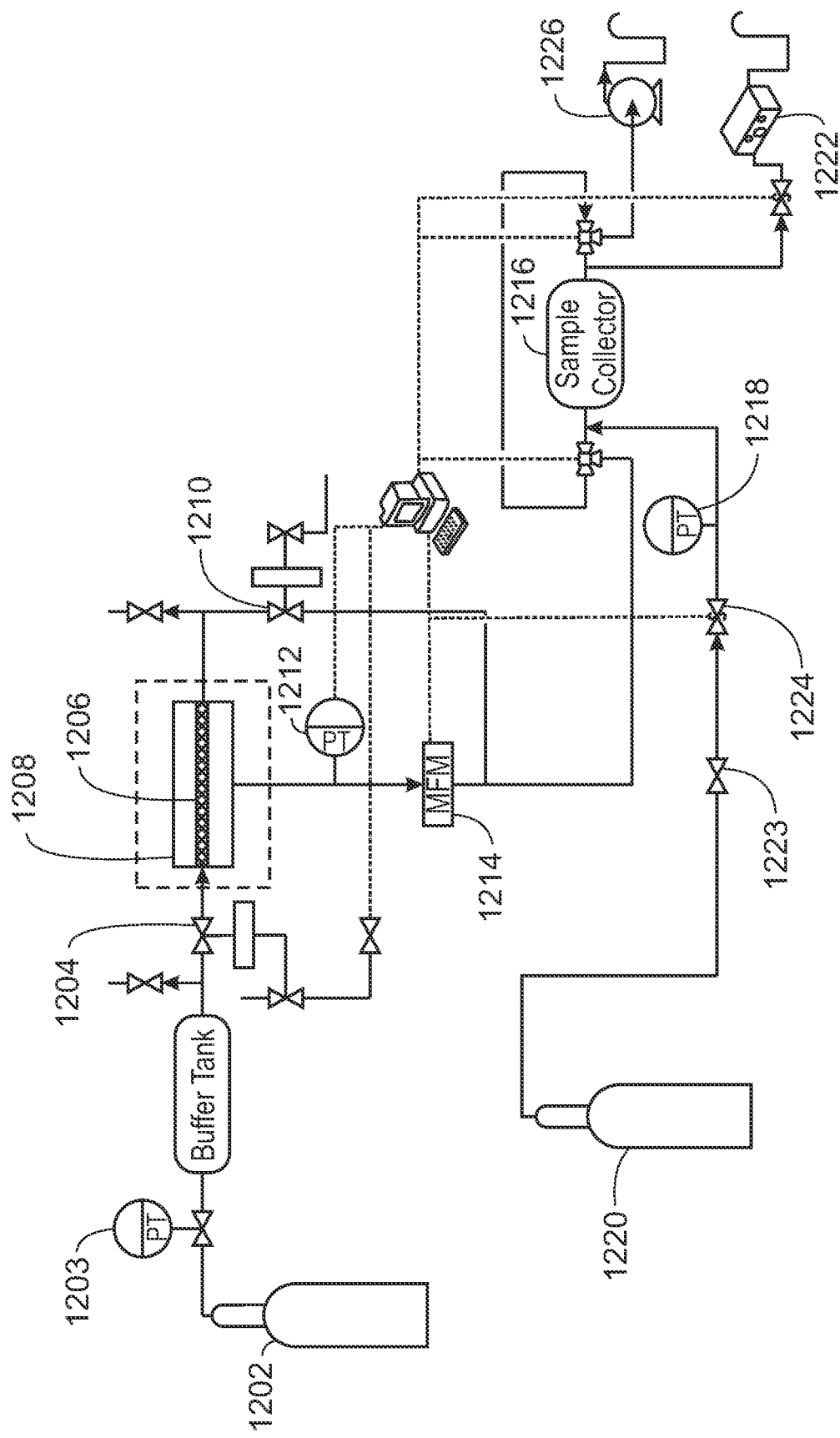
FIG. 12 is a simplified process flow diagram of a permeation apparatus used for measuring single gas and mixed gas permeation properties.

FIG. 12 is a simplified process flow diagram of a continuous-flow gas permeation device 1200 used for measuring single gas and mixed gas permeation properties. A test gas cylinder 1202 provides a single gas or gas mixture for testing. A pressure transducer 1203 measures the gas pressure from the test gas cylinder 1202. An actuated valve 1204 allows the test gas to flow through or pressurize the interior of a sample membrane 1206 that is surrounded by a chamber 1208. A second actuated valve 1210 allows retentate samples to be taken from the inside of the sample membrane 1206 as opposed to permeate samples from the chamber 1208. A pressure transducer 1212 measures the pressure of the permeate in the chamber 1208.

A mass flow meter 1214 measure the amount of permeate exiting the chamber 1208. A sample collector 1216 can be used to collect samples of permeate or retentate for analysis. A pressure transducer 1218 is used to measure the pressure of gas in the sample collector 1216. A carrier gas cylinder 1220 provides a carrier gas, such as helium, for a gas chromatograph 1222. The flow rate of the carrier gas is set by a needle valve 1223. After collection of a gas sample in the sample collector 1216, other valves are closed, and an actuated valve 1224 is opened to sweep the sample to the gas chromatograph 1222. A vacuum pump 1226 is used to pull a vacuum on the system before and between test runs.

The pure-gas permeation properties of membranes prepared from the studied polymers were determined using the permeation system 1200 in a constant-volume mode. For this study, four different pure gases were used: He, $N_2$, $CH_4$, and $CO_2$. The polymeric membranes permeability and selectivity coefficients were calculated from the steady state of the pressure versus time curve, using a constant feed pressure of 100 psi and an operating temperature of 22° C. The obtained results are listed in Table 3. The permeability coefficients are listed in Barrer, where 1 Barrer=$10^{-10}$ cm$^3$ (STP)·cm/cm$^2$·s·cmHg.

TABLE 3

Pure gas permeability and selectivity coefficients for the polymeric membranes measured at 100 psi feed pressure and at 22° C.

| Polyimide | Permeability coefficients (Barrer) | | | | Selectivity coefficients | | |
|---|---|---|---|---|---|---|---|
| | He | $N_2$ | $CH_4$ | $CO_2$ | He/$CH_4$ | $N_2$/$CH_4$ | $CO_2$/$CH_4$ |
| 6FDA-Durene | 451 | 55.9 | 46.1 | 740 | 9.77 | 1.21 | 16.0 |
| 6FDA-BAO | 26.8 | 0.609 | 0.247 | 25.6 | 109 | 2.47 | 63.0 |
| 6FDA-Durene/BAO (1:1) | 158 | 6.96 | 4.27 | 130 | 37.1 | 1.60 | 30.5 |
| 6FDA-Durene/BAO (3:1) | 187 | 17.0 | 11.6 | 261 | 16.0 | 1.50 | 22.4 |

Figure 13:
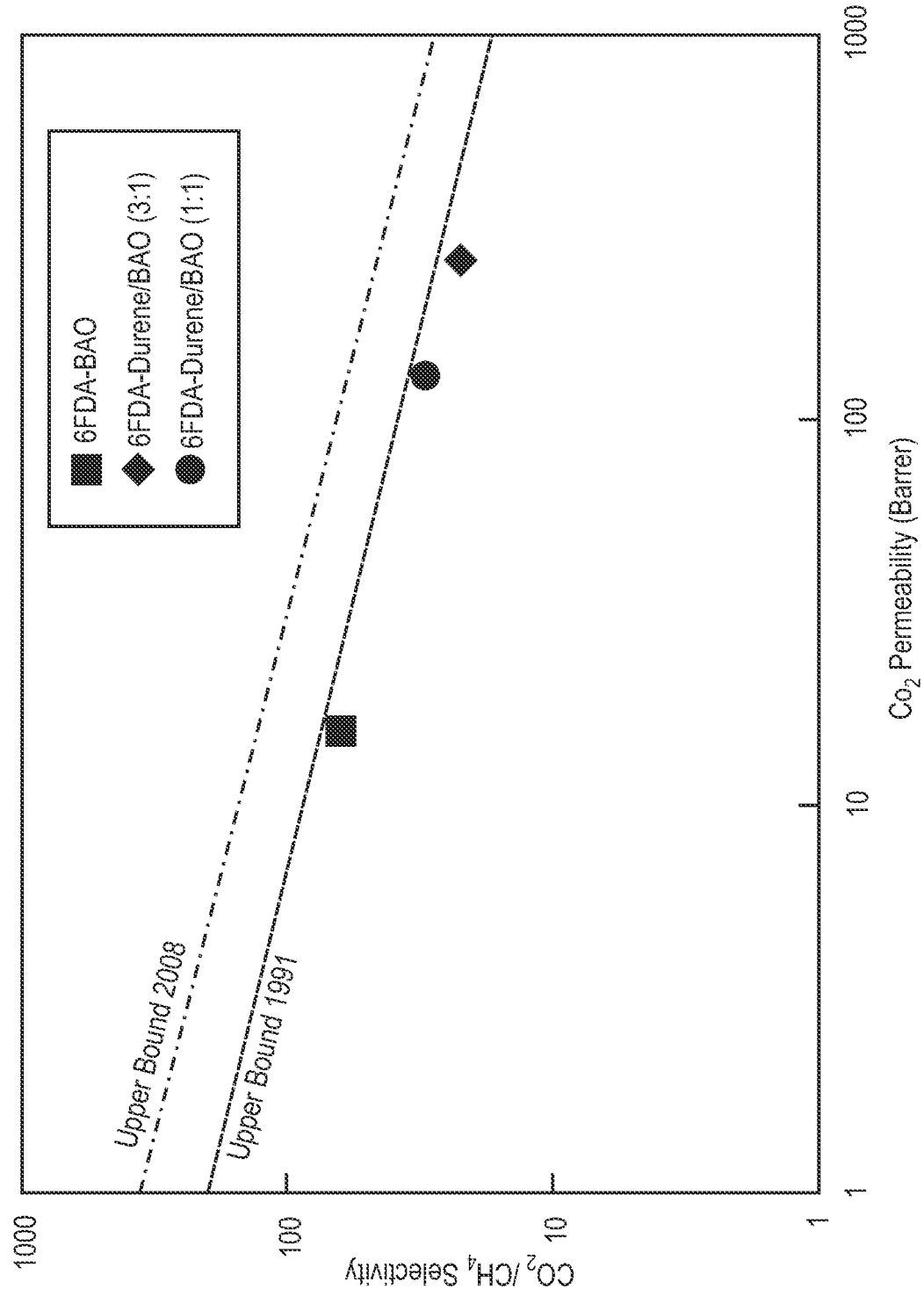
FIG. 13 is a plot of the measured values for $CO_2/CH_4$ compared to permeability-selectivity trade off curves.

FIG. 13 is a plot of the measured values for $CO_2/CH_4$ compared to permeability-selectivity trade off curves. In the early 1990s, a research survey determined that polymers with a high selectivity have a low permeability and that the opposite is also true, that materials with a low selectivity have a high permeability. This provides the plot line labeled as "Upper Bound 1991." The research survey was updated to reflect advancements in membrane technology in an article in 2008, providing the plot line labeled "Upper Bound 2008." See L. M. Robeson, "The Upper Bound Revisited," Journal of Membrane Science 320, 390-400 (2008).

The gas permeation properties of the 6FDA-BAO homopolymer membrane demonstrated that the membrane possesses relatively low $CO_2$ permeability coefficient (25.6 Barrer), while the $CO_2/CH_4$ selectivity coefficient of 63.0 is considered relatively high. The copolymerization methodology, employed in this disclosure, with a permeability-enhancing monomer, such as a durene moiety (FFV=0.2083; Table 2), showed that the $CO_2$ permeability coefficient of the membranes prepared from Durene/BAO copolymers were improved by increasing the FFV within the membrane matrix, compared to that of the 6FDA-BAO homopolymer. In general, membranes prepared from glassy polymers suffer from permeability-selectivity trade off. This is also observed for our studied membranes. However, the gas permeation properties of the 6FDA-Durene/BAO (1:1) membrane afforded permeability and selectivity coefficients in the desired potential commercially favored range.

Sweet Mixed-Gas Permeation Measurements.

Figure 14A:
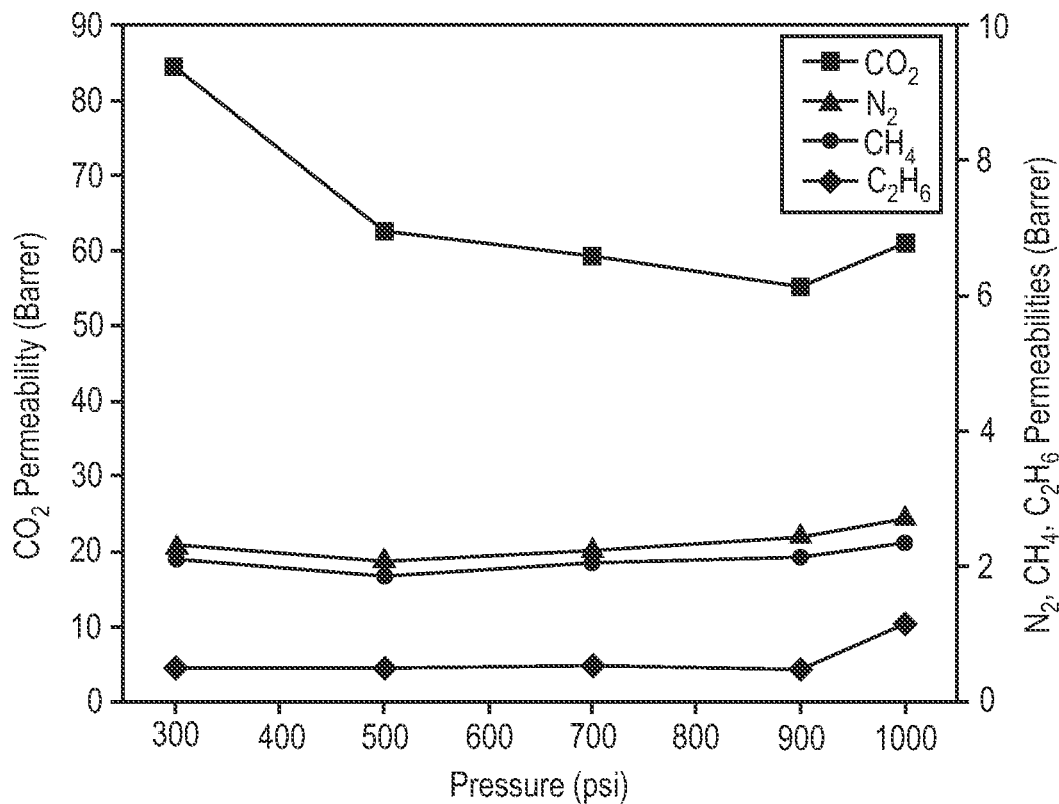
FIG. 14A is a change in a sweet mixed-gas permeability of 6FDA-Durene/BAO (1:1) copolymer at different feed pressures and 22° C.
Figure 14B:
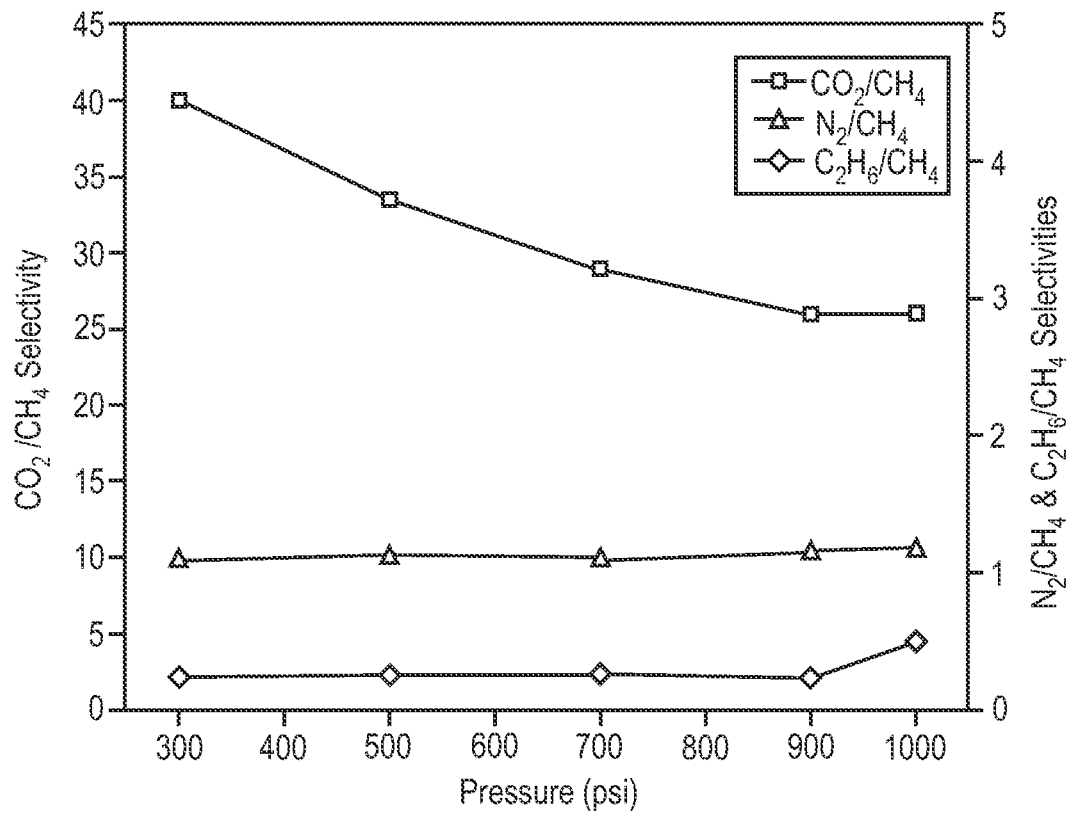
FIG. 14B is the change in the sweet mixed-gas selectivity coefficients of 6FDA-Durene/BAO (1:1) copolymer at different feed pressures and 22° C.

FIG. 14A is a change in a sweet mixed-gas permeability of 6FDA-Durene/BAO (1:1) copolymer at different feed pressures and 22° C. FIG. 14B is the change in the sweet mixed-gas selectivity coefficients of 6FDA-Durene/BAO (1:1) copolymer at different feed pressures and 22° C. Since natural gas is a mixture of gases, it is important to study the mixed-gas separation performance of the polymeric membranes. For that, the best performing polymeric membrane 6FDA-Durene/BAO (1:1) was chosen as a potential candidate. Therefore, its membrane was subjected to a sweet mixed-gas containing 10, 60, 29 and 1 vol. % of $CO_2$, $CH_4$, $N_2$ and $C_2H_6$, respectively. The permeation measurements were recorded at different feed pressures (300-1000 psi) at a fixed temperature of 22° C. The obtained results are listed in Table 4.

TABLE 4

Sweet mixed-gas permeability and selectivity coefficients of 6FDA-Durene/BAO (1:1) at various feed pressures and 22° C.

| Polymer | P (psi) | Permeability coefficients (Barrer) | | | | Selectivity coefficients | | |
|---|---|---|---|---|---|---|---|---|
| | | $N_2$ | $CH_4$ | $C_2H_6$ | $CO_2$ | $N_2/CH_4$ | $C_2H_6/CH_4$ | $CO_2/CH_4$ |
| 6FDA-Durene/BAO (1:1) | 300 | 2.28 | 2.11 | 0.496 | 84.5 | 1.08 | 0.235 | 40.0 |
| | 500 | 2.08 | 1.87 | 0.485 | 62.7 | 1.11 | 0.259 | 33.5 |
| | 700 | 2.23 | 2.05 | 0.534 | 59.4 | 1.09 | 0.260 | 29.0 |
| | 900 | 2.43 | 2.13 | 0.480 | 55.4 | 1.14 | 0.225 | 26.0 |
| | 1000 | 2.70 | 2.34 | 1.16 | 61.1 | 1.15 | 0.496 | 26.1 |

As can be seen from FIG. 14A, the permeability coefficients of $C_2H_6$, $N_2$ and $CH_4$ were slightly increasing with the increase in feed pressure up to 1000 psi. However, for $CO_2$, the permeability coefficient decreased by about 34% when the upstream pressure is increased from 300 to 900 psi. This change in mixed-gas $CO_2$ permeability coefficient is attributed to the competition on Langmuir sorption sites between $CO_2$ and the other existing gaseous molecules in the mixture. However, when the feed pressure was increased to 1000 psi, the permeability coefficients of all of the penetrants increased, indicating some plasticization within the membrane matrix. For example, this allowed the $CO_2$ permeability to increase to 61.1 Barrer.

Accordingly, the $CO_2/CH_4$ selectivity coefficient decreased from 40.5 to 26.1 when the pressure increased from 300 to 1000 psi, because of the decrease of the mixed-gas $CO_2$ permeability and the insignificant change in $CH_4$ permeability. On the other hand, the $C_2H_6/CH_4$ and $N_2/CH_4$ selectivity coefficients were essentially constant up to a feed pressure of 1000 psi, except for $C_2H_6/CH_4$, where the selectivity doubled at 1000 psi. These results of permeability and selectivity at such elevated pressure and for such a multicomponent gas mixture make 6FDA-Durene/BAO (1:1) a very attractive potential material for industrial natural gas sweetening application.

Figure 15A:
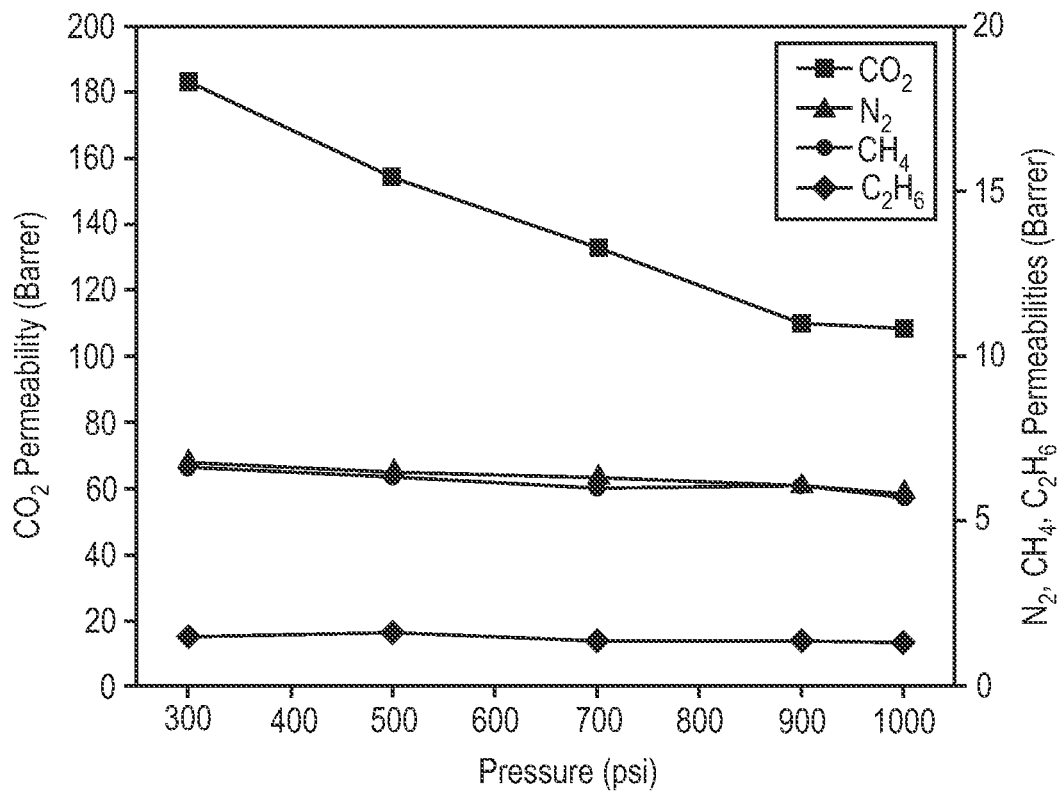
FIG. 15A is a change in a sweet mixed-gas permeability of 6FDA-Durene/BAO (3:1) copolymer at different feed pressures and 22° C.
Figure 15B:
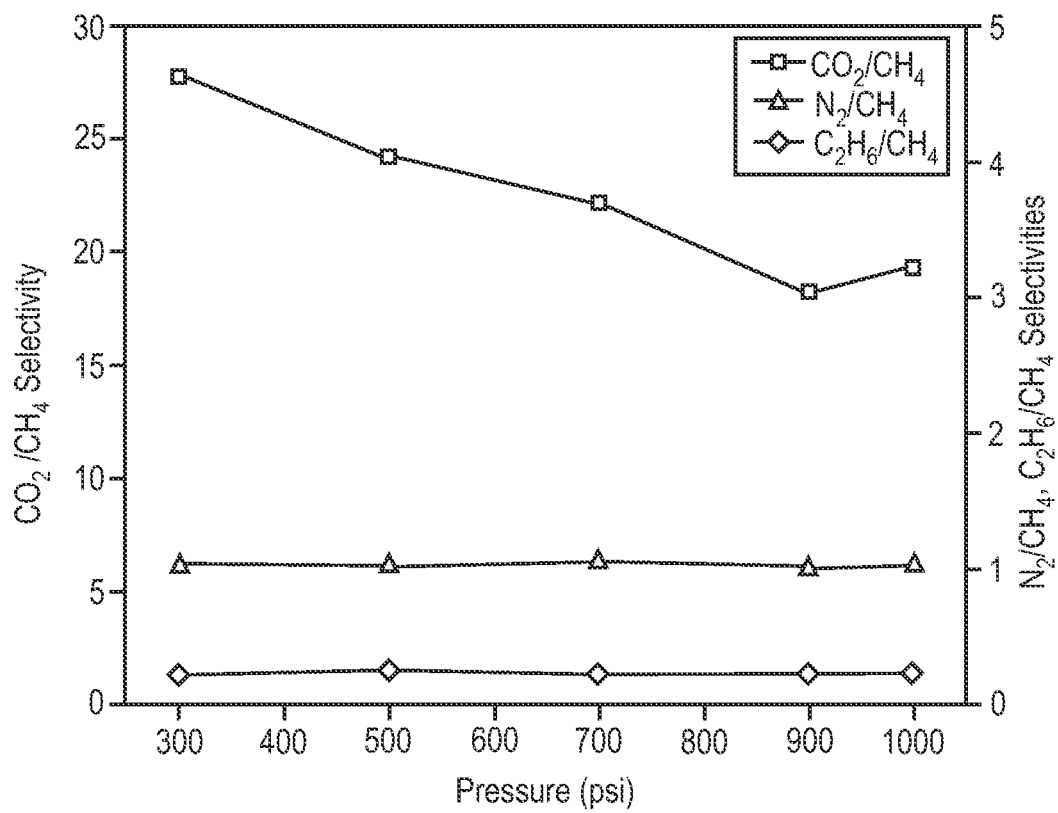
FIG. 15B is the change in the sweet mixed-gas selectivity coefficients of 6FDA-Durene/BAO (3:1) copolymer at different feed pressures and 22° C.

FIG. 15A is a change in a sweet mixed-gas permeability of 6FDA-Durene/BAO (3:1) copolymer at different feed pressures and 22° C. FIG. 15B is the change in the sweet mixed-gas selectivity coefficients of 6FDA-Durene/BAO (3:1) copolymer at different feed pressures and 22° C. Membranes prepared from 6FDA-Durene/BAO (3:1) were studied in a similar fashion to that of 6FDA-Durene/BAO (1:1) using the same gas mixture composition and same testing conditions of pressure and temperature. The obtained data are listed in Table 5.

The data from Table 5 show the benefit of increasing the Durene/BAO molar ratio form 1:1 to 3:1 in 6FDA-Durene/BAO (3:1), where the $CO_2$ permeability coefficient at 300 psi, for example, was found to be 183 Barrer versus 84.5 Barrer for 6FDA-Durene/BAO (1:1) at the same pressure. However, the permeability-selectivity trade-off was prominent, where the $CO_2/CH_4$ selectivity coefficient was calculated to be 27.7 versus 40.0 for 6FDA-Durene/BAO (1:1) at the same pressure (300 psi).

Furthermore, when the feed pressure was increased from 300 psi to 1000 psi, the $CO_2$ permeability coefficient dropped by around 40% with a drop on the $CO_2/CH_4$ selectivity coefficient by around 30%, with no signs of plasticization within the membrane matrix. These results are of great interest compared to other glassy polymers reported in the literature, especially at such elevated feed pressure of gas mixture (1000 psi).

The present invention discloses a new hybrid class of polymeric materials, poly(imide-oxadiazole), which shows to have great potential to be used in gas separation technology. This class of polymers, combines the advantages offered by two families of polymers, polyimides and polyoxadiazoles, into one material. The current invention can change the perspective of designing polymers with enhanced gas transport properties through a specific molecular engineering process.

Figure 16:
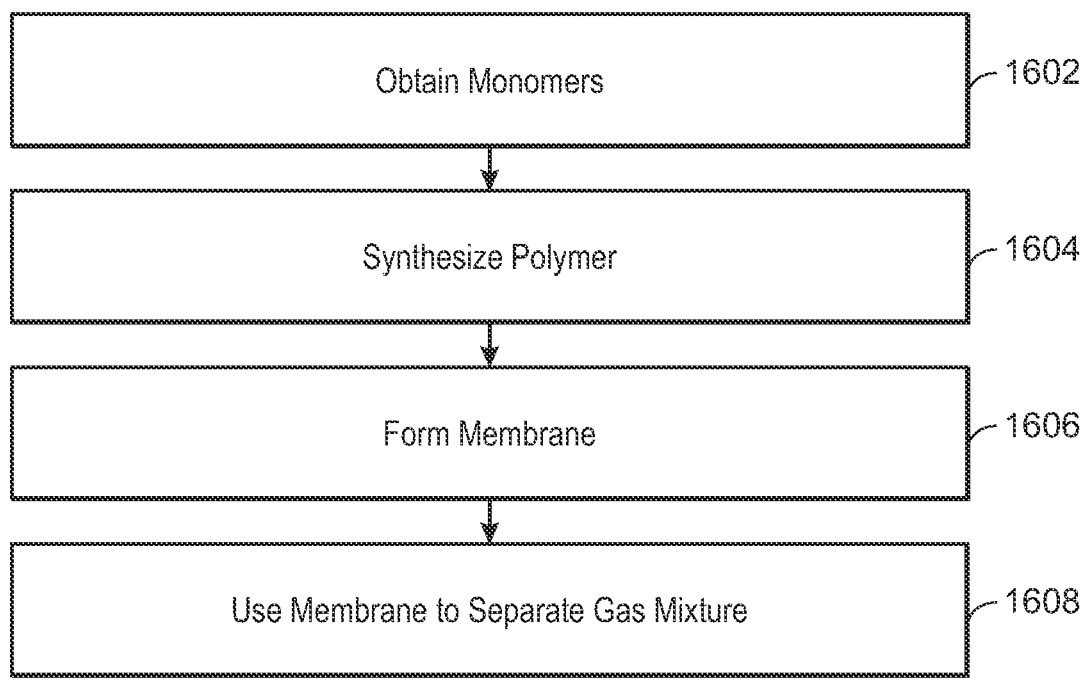
FIG. 16 is a method for synthesizing and using a polymer for forming a membrane to separate a gas mixture

FIG. 16 is a method 1600 for synthesizing and using a polymer for forming a membrane to separate a gas mixture. The method 1600 begins at block 1602 with the synthesis or purchase of the monomers. This may be performed by the techniques described herein. At block 1604, the polymer used for the membrane is synthesized, for example, using the techniques described herein. At block 1606, a membrane is formed from the polymer, for example, using the solvent evaporation techniques described herein. At block 1608, the membrane is used to separate gas mixtures, for example, to sweeten natural gas by the separation of acid gases, such as $H_2S$, $CO_2$, or COS.

TABLE 5

Sweet mixed-gas permeability and selectivity coefficients of 6FDA-Durene/BAO (3:1) at various feed pressures and 22° C.

| Polymer | P (psi) | Permeability coefficients (Barrer) | | | | Selectivity coefficients | | |
|---|---|---|---|---|---|---|---|---|
| | | $N_2$ | $CH_4$ | $C_2H_6$ | $CO_2$ | $N_2/CH_4$ | $C_2H_6/CH_4$ | $CO_2/CH_4$ |
| 6FDA-Durene/BAO (3:1) | 300 | 6.74 | 6.60 | 1.47 | 183 | 1.02 | 0.223 | 27.7 |
| | 500 | 6.47 | 6.37 | 1.61 | 154 | 1.02 | 0.253 | 24.2 |
| | 700 | 6.32 | 6.00 | 1.36 | 133 | 1.05 | 0.227 | 22.2 |
| | 900 | 6.06 | 6.03 | 1.37 | 110 | 1.00 | 0.227 | 18.2 |
| | 1000 | 5.82 | 5.66 | 1.32 | 109 | 1.03 | 0.233 | 19.3 |

Embodiments

An embodiment described in examples herein provides a gas separation membrane. The gas separation membrane including a poly(imide-oxadiazole) polymer including an oligomer having a structure including:

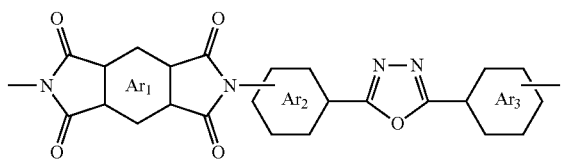

In this structure, $Ar_1$, $Ar_2$, and $Ar_3$ include aromatic moieties, and $Ar_1$, $Ar_2$, and $Ar_3$ are each independently selected.

In an aspect, the gas separation membrane includes a homopolymer of the structure:

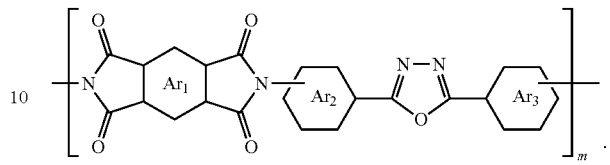

In an aspect, the gas separation membrane includes a copolymer of the structure:

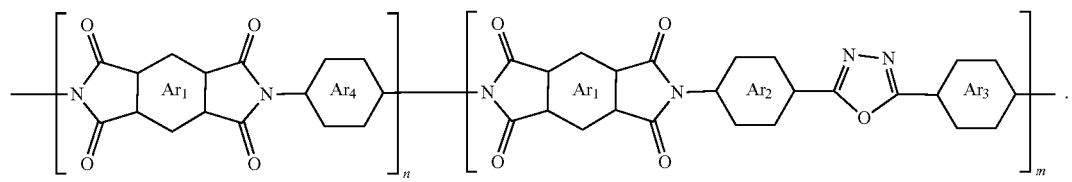

In this structure, $Ar_4$ includes an aromatic moiety.

In an aspect, the gas separation membrane includes a random copolymer. In an aspect, the gas separation membrane includes a block copolymer.

In an aspect, the gas separation membrane includes a copolymer of the structure:

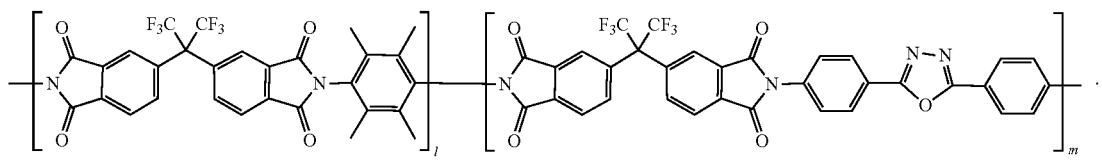

In an aspect, the gas separation membrane includes a copolymer that includes an oligomer of the structure:

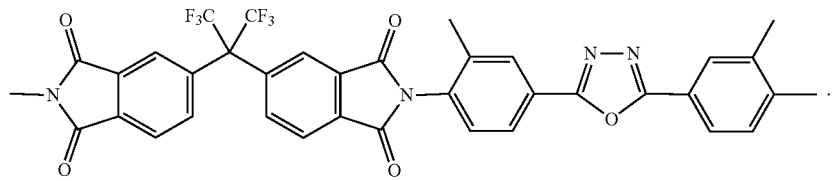

In an aspect, the gas separation membrane includes a copolymer that includes an oligomer of the structure:

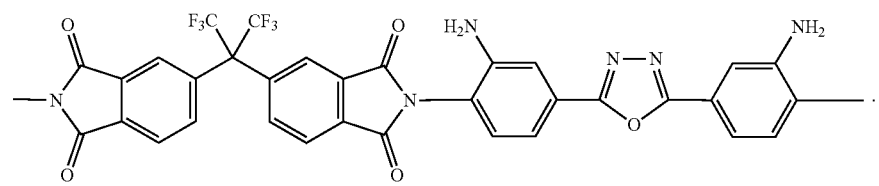

In an aspect, the gas separation membrane includes a copolymer that includes an oligomer of the structure:

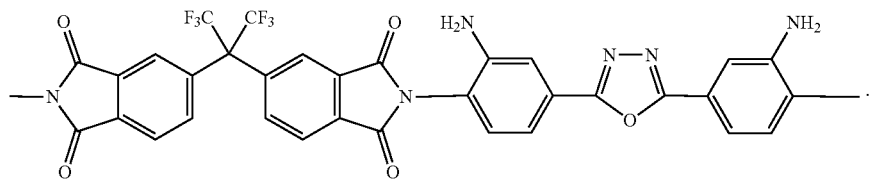

In an aspect, the gas separation membrane includes a copolymer that includes an oligomer of the structure:

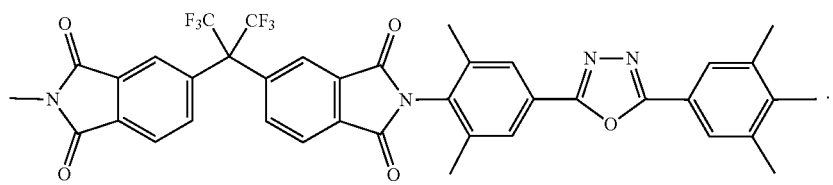

In an aspect, the gas separation membrane includes a copolymer that includes an oligomer of the structure:

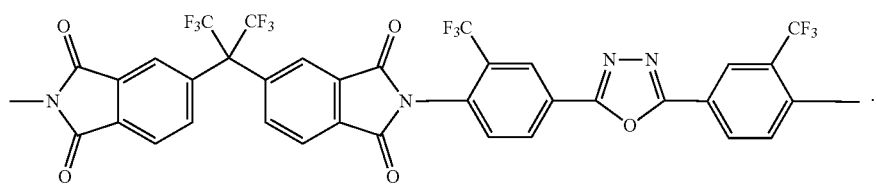

In an aspect, the gas separation membrane includes a copolymer that includes an oligomer of the structure:

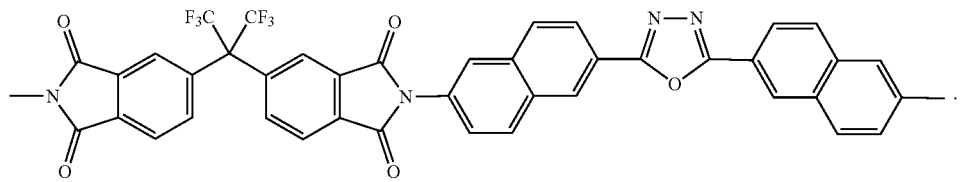

In an aspect, the gas separation membrane includes a monomer with the structure:

In an aspect, the gas separation membrane includes a monomer with the structure:

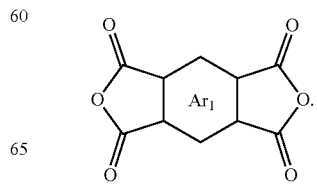

In an aspect, the gas separation membrane includes a monomer with the structure:

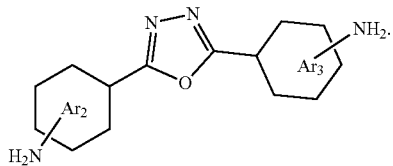

In an aspect, the gas separation membrane includes a monomer with the structure:

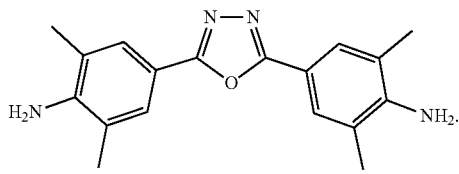 [SMILES: Cc1cc(-c2nnc(-c3cc(C)c(N)c(C)c3)o2)cc(C)c1N]

In an aspect, the gas separation membrane includes a monomer with the structure:

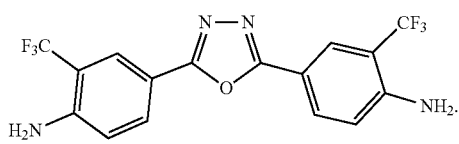

In an aspect, the gas separation membrane includes a monomer with the structure:

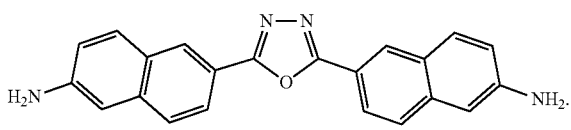 [SMILES: Nc1ccc2cc(-c3nnc(-c4ccc5cc(N)ccc5c4)o3)ccc2c1]

Another embodiment described in examples herein provides a method for forming a gas separation membrane. The method includes, obtaining a diamine oxadiazole monomer, obtaining an imide monomer, and reacting the diamine oxadiazole monomer with the imide monomer to form a polymer. The polymer is dissolved in a solvent to form a polymer solution. A dense film is formed from the polymer solution. The dense film is tried to form the gas separation membrane.

In an aspect, the diamine oxadiazole monomer is formed by heating an amino benzoic acid with hydrazine sulfate to form a symmetric diamine oxadiazole monomer.

In an aspect, the amino benzoic acid includes 4-amino-3-methylbenzoic acid, 4-amino-3,5-dimethylbenzoic acid, 4-aminobenzoic acid, 4-amino-3-(trifluoromethyl)benzoic acid, 3-amino-4-methylbenzoic acid, 3-aminobenzoic acid, 6-amino-2-naphthoic acid, 6-aminopicolinic acid, or 3,4-diaminobenzoic acid.

In an aspect, the diamine oxadiazole monomer is formed by heating at least two amino benzoic acids with hydrazine sulfate to form an asymmetric diamine oxadiazole monomer.

In an aspect, the at least two amino benzoic acids include 4-amino-3-methylbenzoic acid, 4-amino-3,5-dimethylbenzoic acid, 4-aminobenzoic acid, 4-amino-3-(trifluoromethyl)benzoic acid, 3-amino-4-methylbenzoic acid, 3-aminobenzoic acid, 6-amino-2-naphthoic acid, 6-aminopicolinic acid, or 3,4-diaminobenzoic acid, or any combinations thereof.

In an aspect, the polymer is formed by heating the diamine oxadiazole monomer with the imide monomer with a lithium chloride catalyst.

In an aspect, the polymer is formed by heating the diamine oxadiazole monomer, the imide monomer, and an aromatic diamine with a lithium chloride catalyst.

In an aspect, the aromatic diamine includes

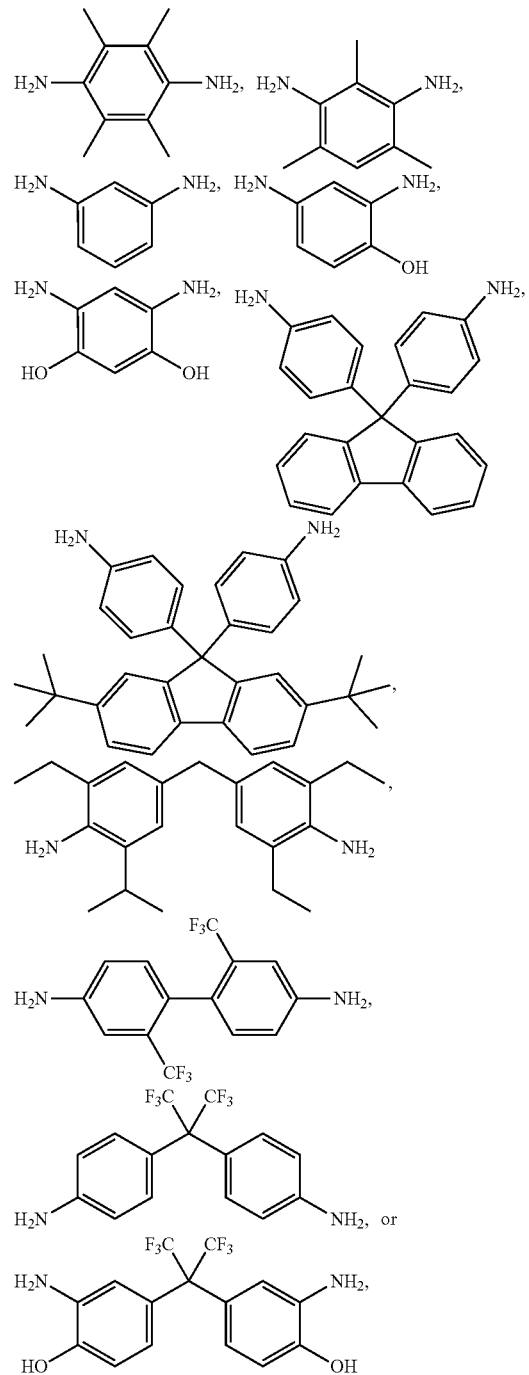

or any combinations thereof.

Other implementations are also within the scope of the following claims.

What is claimed is:

1. A gas separation membrane comprising a poly(imide-oxadiazole) polymer comprising:

a first oligomer having a first structure comprising:

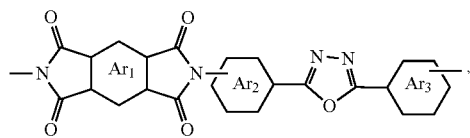

wherein Ar$_1$, Ar$_2$, and Ar$_3$ comprise aromatic moieties, and wherein Ar$_1$, Ar$_2$, and Ar$_3$ are each independently selected; and a monomer having a second structure comprising:

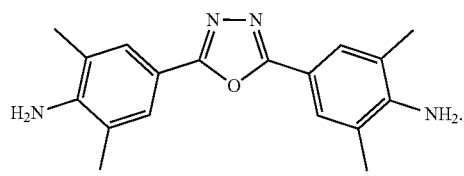 [SMILES: Cc1cc(-c2nnc(-c3cc(C)c(N)c(C)c3)o2)cc(C)c1N]

2. The gas separation membrane of claim 1, wherein the poly(imide-oxadiazole) polymer comprises a plurality of the first oligomer.

3. The gas separation membrane of claim 1, wherein the poly(imide-oxadiazole) polymer comprises a third structure comprising:

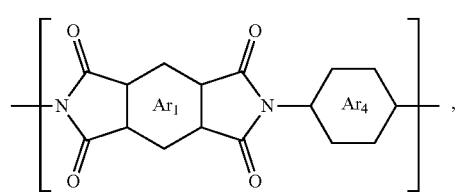

wherein Ar$_4$ comprises an aromatic moiety.

4. The gas separation membrane of claim 3, further comprising a random copolymer.

5. The gas separation membrane of claim 3, further comprising a block copolymer.

6. The gas separation membrane of claim 1, wherein the gas separation membrane comprises a copolymer having a third structure comprising:

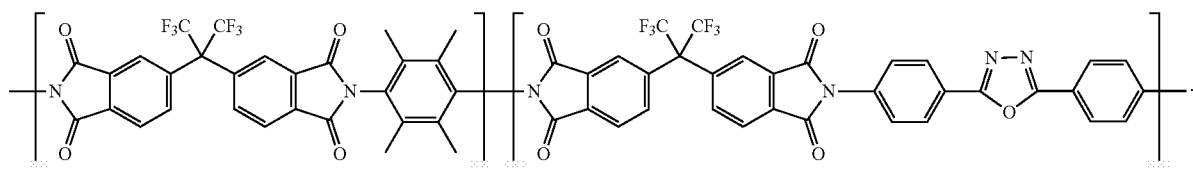

7. The gas separation membrane of claim 1, wherein the gas separation membrane comprises a copolymer comprising a second oligomer having a third structure comprising:

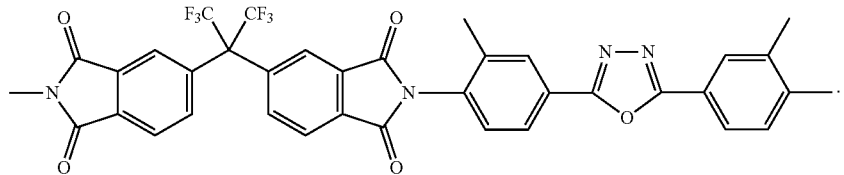

8. The gas separation membrane of claim 1, wherein the gas separation membrane comprises a copolymer comprising a second oligomer having a third structure comprising:

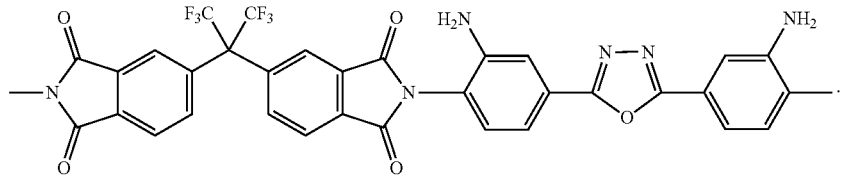

9. The gas separation membrane of claim 1, wherein the gas separation membrane comprises a copolymer comprising a second oligomer having a third structure comprising:

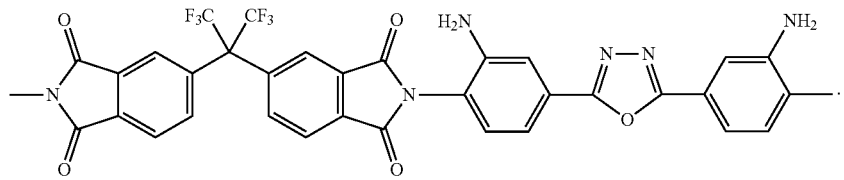

10. The gas separation membrane of claim 1, wherein the gas separation membrane comprises a copolymer comprising a second oligomer having a third structure comprising:

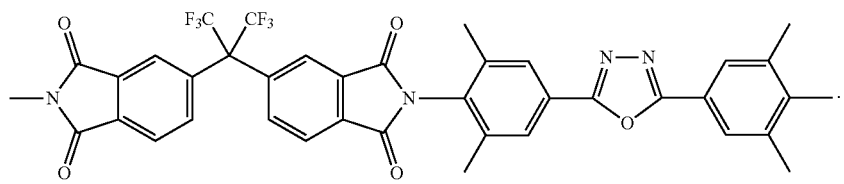

11. The gas separation membrane of claim 1, wherein the gas separation membrane comprises a copolymer comprising a second oligomer having a third structure comprising:

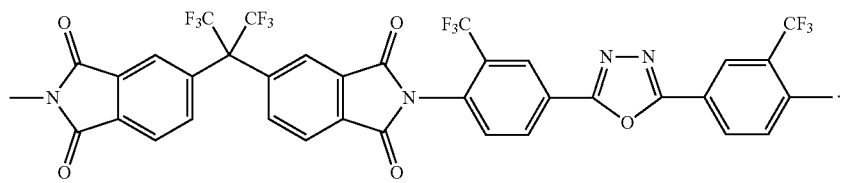

12. The gas separation membrane of claim 1, wherein the gas separation membrane comprises a copolymer comprising a second oligomer having a third structure comprising:

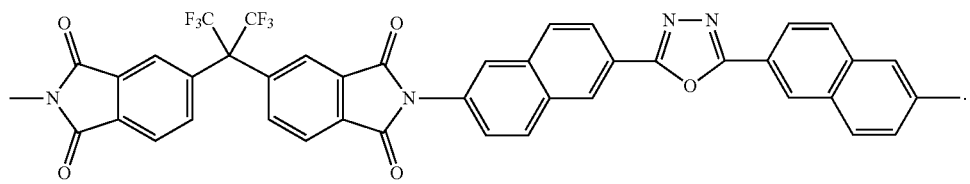

13. The gas separation membrane of claim 1, wherein the gas separation membrane comprises a second monomer having a third structure comprising:

14. The gas separation membrane of claim 1, wherein the gas separation membrane comprises a second monomer having a third structure comprising:

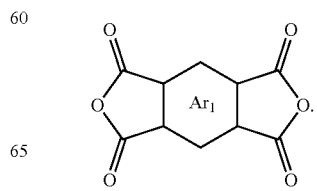

15. The gas separation membrane of claim 1, wherein the gas separation membrane comprises a second monomer having a third structure comprising:

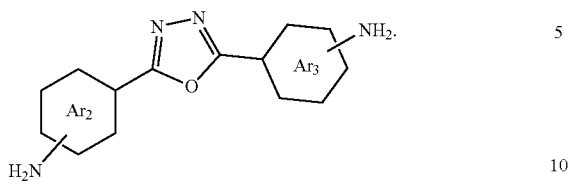

16. The gas separation membrane of claim 1, wherein the gas separation membrane comprises a second monomer having a third structure comprising:

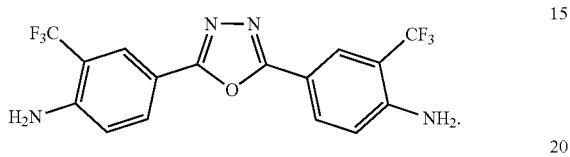

17. The gas separation membrane of claim 1, wherein the gas separation membrane comprises a second monomer having a third structure comprising:

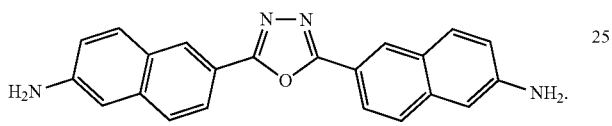

* * * * *